(12) United States Patent
Ueda et al.

(10) Patent No.: US 7,180,618 B2
(45) Date of Patent: Feb. 20, 2007

(54) IMAGE EDITING SYSTEM AND IMAGE EDITING METHOD

(75) Inventors: Maroka Ueda, Nagano-ken (JP); Ryuji Chino, Tokyo (JP); Ryuta Namiki, Tokyo (JP); Akemi Shoji, Tokyo (JP)

(73) Assignee: Seiko Epson Corporation, Tokyo (JP)

( * ) Notice: Subject to any disclaimer, the term of this patent is extended or adjusted under 35 U.S.C. 154(b) by 874 days.

(21) Appl. No.: 09/983,892

(22) Filed: Oct. 26, 2001

(65) Prior Publication Data
US 2002/0057454 A1 May 16, 2002

(30) Foreign Application Priority Data
Oct. 27, 2000 (JP) ............................. 2000-329722
Nov. 1, 2000 (JP) ............................. 2000-334811

(51) Int. Cl.
G06F 15/00 (2006.01)
G06F 17/00 (2006.01)
G06K 9/00 (2006.01)
G06K 9/03 (2006.01)

(52) U.S. Cl. .................... 358/1.15; 358/1.16; 382/162; 382/309; 715/502; 715/530

(58) Field of Classification Search ............... 358/1.15, 358/1.16, 537; 715/530, 838, 502; 399/182; 382/162, 309; 717/177
See application file for complete search history.

(56) References Cited
U.S. PATENT DOCUMENTS
6,167,382 A * 12/2000 Sparks et al. ................. 705/26

6,522,418 B2 * 2/2003 Yokomizo et al. .......... 358/1.15
6,718,353 B2 * 4/2004 Hara et al. .................. 715/502

FOREIGN PATENT DOCUMENTS

| JP | 06-251113 A | 9/1994 |
| JP | 07-098579 A | 4/1995 |
| JP | 08-255078 A | 10/1996 |
| JP | 11-98286 A | 4/1999 |
| JP | 11-112793 A | 4/1999 |

OTHER PUBLICATIONS
Japanese Office Action.
* cited by examiner

*Primary Examiner*—King Y. Poon
*Assistant Examiner*—Thomas J. Lett
(74) *Attorney, Agent, or Firm*—Sughrue Mion, PLLC

(57) ABSTRACT

A server distributes a user edition application (layout operation application) in response to a layout operation request sent from a client system. The client system executes the user edition application and displays a screen page for fetching new image information, which is not stored in the server, from a photo sharing system, an image input device or an image file. When a user performs a layout operation using image information supplied from the server and new image information, the content of operation is notified the server. The server performs an image edition based on the notified operation and distributes the resultant edit image to the client system.

13 Claims, 25 Drawing Sheets

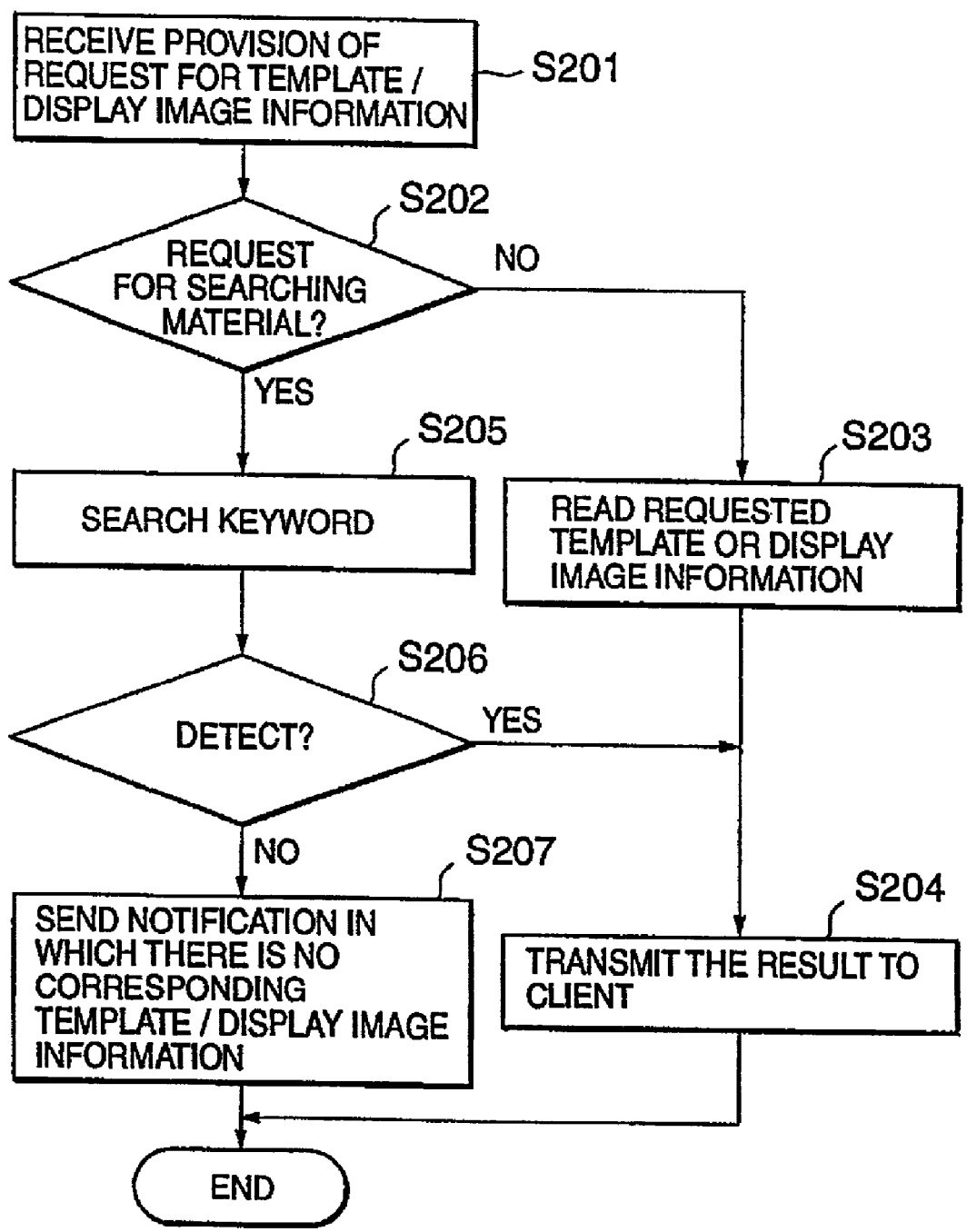

FIG.5A

| MATERIAL NO. | KEYWORD 1 | KEYWORD 2 | KEYWORD 3 | KEYWORD 4 |
|---|---|---|---|---|
| #1 | FLOWER | ROSE | MANY | RED |
| #2 | ADULT | MAN | FACE | FRONT |
| #3 | SCENE | MOUNTAIN | GREEN | PAGE |
| #4 | CHILD | BABY | FACE | UP |
| ⋮ | ⋮ | ⋮ | ⋮ | ⋮ |

FIG.5B

| TEMPLATE NO. | KEYWORD 1 | KEYWORD 2 | KEYWORD 3 | KEYWORD 4 |
|---|---|---|---|---|
| #T1 | LARGE SIZE | FOR WOMAN | COSMETICS | — |
| #T2 | POSTCARD | SUMMER GREETING CARD | — | — |
| #T3 | POP | PINBALL | NEW PRODUCT | DIGITAL BASE |
| #T4 | LARGE SIZE | DRINKING WATER | ALCOHOL | CAN PRODUCT |
| ⋮ | ⋮ | ⋮ | ⋮ | ⋮ |

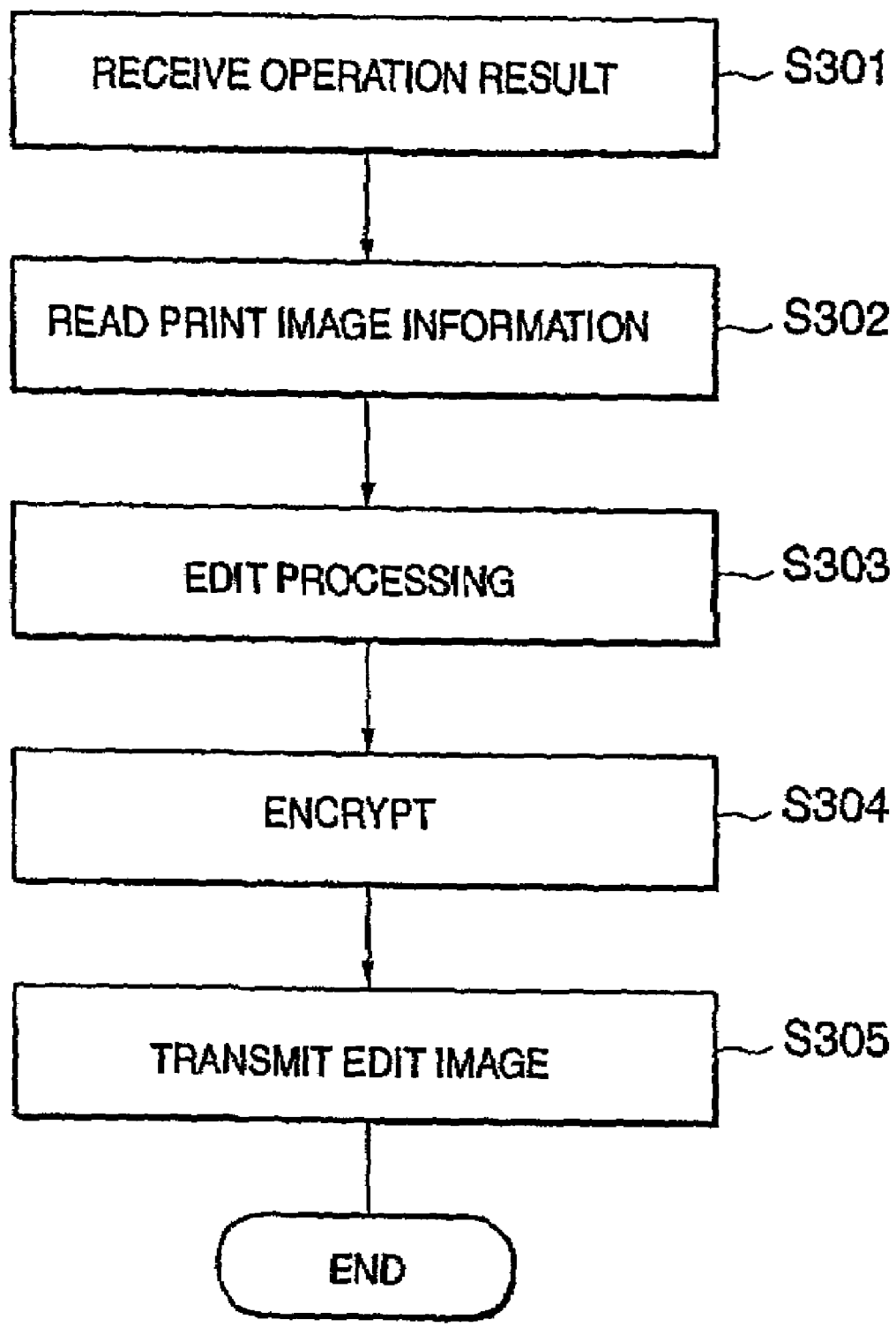

IMAGE EDITING SYSTEM AND IMAGE EDITING METHOD

CROSS-REFERENCE TO RELATED APPLICATIONS

This application is based upon and claims the benefit of priority from the prior Japanese Patent Applications Nos. 2000-329722, filed Oct. 27, 2000, and 2000-334811 filed Nov. 1, 2000, the entire contents of both of which are incorporated herein by reference.

BACKGROUND OF THE INVENTION

1. Field of the Invention

The present invention relates to a method for distributing image information between information processors (image processors) comprising functions to operate image information via a network such as a satellite connection. Particularly, this invention relates to a technique for receiving a client's desire to edit image information along the desire and distribute edited image information efficiently.

2. Description of the Related Art

Conventionally, printed materials such as poster are used for the purpose of advertisements. For such printed materials, various kinds of materials including postcard-size poster to large-size poster are used. Normally, the client, who wishes to prepare such printed materials, asks the printing agency to generate the printed materials.

However, we have often experienced that the cost relating to the generation of printed materials is increased in the case where the number of printed materials is small at the time of requesting the printing agency.

While, in recent years, performance of the color printer has been rapidly improved and a reduction in price has been advanced. For this reason, the client purchases the color printer and prints the screen page generated by the client by use of this color printer in some cases. This decreases the cost in generating the printed materials as compared with the case in which the client asks the printing agency to generate the printed materials.

However, even in this case, it is difficult for the client, who is not a professional person, to generate the printed materials. More specifically, various kinds of choices are provided in connection with the printing environment, material (photographic image, illustration image, the same is applied afterwards) to be used in the printing, character font, edition, and kinds of colors. Then, a large load must be taken on the operator, who performs the layout generation, and the computer system to be used in order that the client side performs the layout generation relating to these items. Particularly, a great number of processing steps, including e.g., processing in which compressed image information that expresses the material to be used is once decompressed, is required to edit image information.

SUMMARY OF THE INVENTION

It is an object of the present invention is to provide a specific system that can construct an environment where a client's computer performs layout generation easily and distribute edited image information (edit image) where materials are arranged or superimposed on one other via a network.

More specifically, the object of the present invention is to provide an image editing apparatus that is capable of editing image information rapidly and efficiently, an image processing method, and an edit image distributing method using a plurality of image processing devices.

Another object of the present invention is to provide a program suitable for executing the above image processing method on the general-purpose computer or a storage medium.

The word "materials" means materials that are used to represent an image such as a photographic image, illustration image, part screen page, background, and the like.

According to a first aspect of the present invention, there is provided an image processing apparatus comprising: a memory for storing a first image which represents a desired material and a second image which represents the material with data quantity different from data quantity of the first image to be linked with each other; a communication device for communicating with an information processing device having functions of receiving an instruction from a user of the information processing device for operation with respect to an operation image including the first image and of processing the operating image according to the instruction; and a processor for sending the first image to the information processing device via the communication device to obtain the operating image including the first image and an instruction for operation to the operating image from the information processing device, substitute the first image included in the obtained operating image and the second image stored in the memory for each other, edit the operating image subjected to substitution according to the obtained instruction for operation, and transmit the edited image to the information processing device via the communication device.

It may be arranged that the operation image includes one of an image held in advance and an image fetched from an outer section.

It may be arranged that the information processing device fetches the image from the outer section via the internet, and the fetched image is prestored in a predetermined memory area of the outer section for private use.

According to a second aspect of the present invention, there is provided that a method applied to an image processing apparatus including a memory for storing a first image which represents a desired material, the method comprising the steps of: sending the first image to an information processing device having functions of receiving an instruction from a user of the information processing device for operation with respect to an operation image including the first image and processing the operation image according to the instruction; obtaining the operating image including the first image and an instruction for operation to the operating image from the information processing device; substituting the first image included in the obtained operating image and a second image which represents the material with data quantity different from data quantity of the first image; editing the operating image subjected to substitution according to the obtained instruction; and transmitting the edited image to the information processing device.

According to a third aspect of the present invention, there is provided an image processing apparatus comprising: storing means for storing a first image which represents a desired material and a second image which represents the material with data quantity different from data quantity of the first image to be linked with each other; communication means for communicating with an information processing device having functions of receiving an instruction from a user of the information processing device for operation with respect to an operation image including the first image and of processing the operating image according to the instruction; and means for sending the first image to the information processing device via the communication means to obtain the operating image including the first image and an instruction for operation to the operating image from the information processing device, substitute the first image included in the obtained operating image and the second image stored in the storing means for each other, edit the operating image subjected to substitution according to the obtained instruction for operation, and transmit the edited image to the information processing device via the communication means.

According to a fourth aspect of the present invention, there is provided a computer program for a computer having a memory for storing a first image which represents a desired material, the method comprising the steps of: sending the first image to an information processing device having functions of receiving an instruction from a user of the information processing device for operation with respect to an operation image including the first image and processing the operation image according to the instruction; obtaining the operating image including the first image and an instruction for operation to the operating image from the information processing device; substituting the first image included in the obtained operating image and a second image which represents the material with data quantity different from data quantity of the first image; editing the operating image subjected to substitution according to the obtained instruction; and transmitting the edited image to the information processing device.

It may be arranged that the computer program is stored in a computer readable storage medium.

According to a fifth aspect of the present invention, there is provided an apparatus comprising: a communication device for communicating with a computer system and a photo memory system via a communication network, the computer system having a memory for storing a first image which represents a desired material, a second image which represents the material with data quantity different from data quantity of the first image to be linked with each other, and a program for causing the apparatus to serve as a image editing system, the photo memory system having a memory area for private use of a user of the apparatus, the memory area storing a third image; and a processor for sending an access request to the computer system via the communication device, receiving the program which is sent from the computer system in response to the access request and executing the received program to obtain the first image from the computer system, obtain the third image from the photo memory system, display an operation image including the first and third images on a predetermined display, receive an instruction from the user for operation with respect the operation image, process the operation image according to the instruction, send the processed operation image and the instruction to the computer system, receive an edited image which is generated on the computer system by substituting the first image included in the processed operation image and the second image and editing the operation image subjected to substitution according to the instruction, and send the edited image to a predetermined printing device for printing the edited image.

According to the sixth aspect of the present invention, there is provided an edit image distributing method, which is executed on a network system comprising: a computer system which prestores a first image that represents an arbitrary material, a second image which represents the material with data quantity different from data quantity of the first image and an application program for constructing an image operation environment on an apparatus which requests an image operation; a photo sharing system which prestores a third image which is permitted to be provided to a request source and a fourth image which is permitted to be provided in response to a request when authentication of a request source is normally performed; and an apparatus which has a communication device to communicate with the computer system and the photo sharing system via a network, an input device for inputting a fifth image without passing through the network, a storage which prestores a sixth image in a predetermined format, and a display device, the method comprising the steps of: transmitting an operation request of an image to the computer system from the apparatus; transmitting the first image and the application program to the apparatus from the computer system which has received the operation request; executing the received application program on the apparatus, whereby displaying an operating image including the received first image on the display device and adding an image to the operating image; receiving an operation to be provided to the operating image on the apparatus so as to transmit the received operation and the added image to the computer system; and substituting the first image included in the received operating image and the second image for each other on the computer system so as to edit the operating image subjected to substitution according to the obtained instruction and transmit the edited image to the apparatus, wherein in the image adding step, at least one of the third image and the fourth image stored in the photo sharing system and at least one of the fifth image input from the input device and the sixth image stored in the storage are added to the operating image on the apparatus.

The technique provided by the present invention implements the environment where the layout generation can be easily performed in the client's computer. Here, it is possible to provide image information that expresses the material, which the client desires. It is also possible to obtain desired image information through a channel used heavily and to perform the layout generation in the case where the client wishes to use image information that expresses other material. Then, the edit image where materials are arranged or superimposed on one another is distributed via the network according to this layout generation.

BRIEF DESCRIPTION OF THE DRAWINGS

These objects and other objects and advantages of the present invention will become more apparent upon reading of the following detailed description and the accompanying drawings in which:

FIG. 4 is a procedure explanatory view to explain the processing for providing template/display image of the server;

FIG. 5A is a view illustrating material numbers and key words corresponding thereto stored in the table of server;

FIG. 5B is a view illustrating material numbers and key words corresponding thereto stored in the table of server, FIG. 6 is a procedure explanatory view to explain the processing in response to the reception of server operation result;

DETAILED DESCRIPTION OF THE PREFERRED EMBODIMENT

Figure 1:
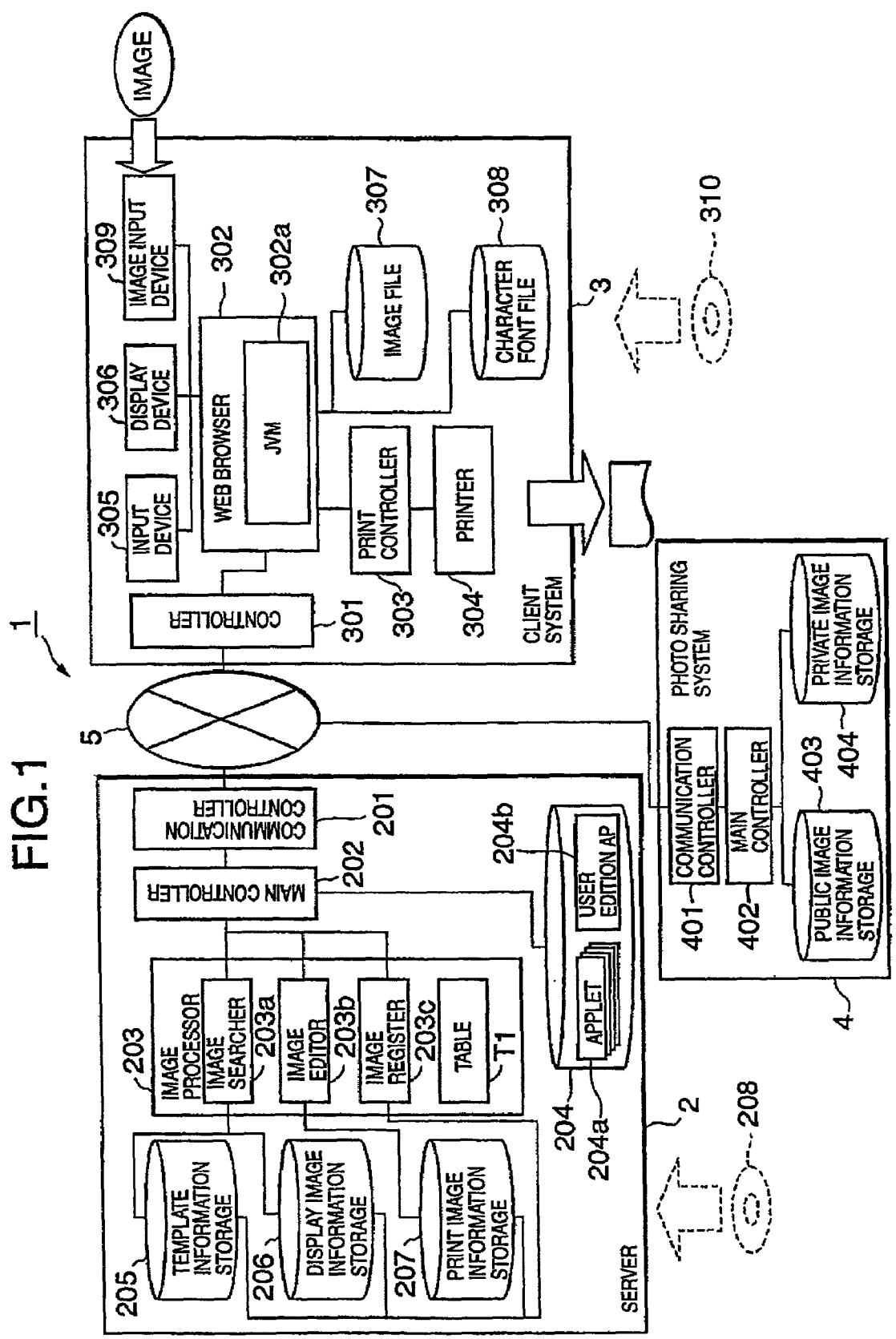
FIG. 1 is a view illustrating the configuration of an edited image distributing system of an embodiment of the present invention.

An embodiment of the present invention will be specifically described with reference to the drawings accompanying herewith.

The following will specifically explain an embodiment in which the present invention is applied to an edited image distributing system that provides image information, which expresses material along the client's desire via a plurality of paths, to distribute an image edited according to the layout operation done by the client side via a network <System Configuration>

The edited image distributing system 1 is composed of a server 2 as one example of first image processor, client system 3 as one example of second image processor, photo sharing system 4, and a network 5 as a transmission medium of data transmitted/received between the server 2 and client system 3.

The server 2 has functions including 1) distribution of Java applet according to an access request from the client system 3, 2) distribution of an layout operation application (hereinafter referred to as "user edition AP") according to the distributed Java applet, and 3) various kinds of processing based on communication with the client system in which the distributed Java applet and user edition AP are executed. The processing includes the provision of image information that expresses material requested from the client system 3, edit processing provided to image information according to the result of the operation, and the distribution edited image generated thereby.

The client system 3 is a computer system provided on the client side that wishes to generate the printed material. The client system 3 has function including 1) transmission of access request to the server 2, and 2) execution of Java applet transmitted from the server 2 and the user edition AP. Particularly, various processing is carried out by the execution of Java applet and user edition AP together with the server 2. This implements the request to provide material, the display of image information to support the provided material and layout operation, the transmission of operation result showing the layout operation from the operator, and the printing of edited image received from the server 2.

Particularly, this client system 3 obtains desired image information from the plurality of paths in addition to image information provided from the server 2 so as to implement such an environment that can provide the layout operation to the obtained image information together with image information obtained from the server 2.

The photo sharing system 4 is one in which image information stored in the photo sharing system in advance is provided via the network 5. Image information held in the photo sharing system 4 can be largely classified into image information (public image information) provided to the request source unconditionally and image information (private information) provided to a specific user registered in advance or every such a user.

In connection with the network 5, a network using a wire line, for example, the Internet can be used. However, a network using satellite communication that can ensure large communication capacities may be employed.

Though FIG. 1 illustrates only one client system 3 in order to simplify the drawing, a plurality of client systems is connectable to the network 5 in connection with the actual system.

<Configuration of Server>

The configuration of server 2 will be explained. The server 2 is composed of a communication controller 201, main controller 202, image processor 203, storage 204, template information storage 205, display image information storage 206, and printing image information storage 207.

The communication controller 201 is provided between the network 5 and main controller 202, and performs communication control according to a predetermined protocol in order to transmit/receive various kinds of data. The main controller 202 controls the entire operation of server 2. Namely, the main controller 202 is connected to the communication controller 201, image processor 203, and storage 204, and performs the distribution of Java applet and user edition AP according to the access request, the layout operation and processing necessary for the support in the client system 3 together with the image processor 203.

The image processor 203 executes various kinds of processing relating to image information under control of the main controller 202. The image processor 203 has an image searcher 203a, image editor 203b, image register 203c, and table T1. The image searcher 203a sends a template or display image information to the main controller according to the specified template number and material number and searches the template and display image information according to characteristic information such as a keyword with reference to table T1. The image editor 203b edits print image information according to the result of layout operation performed by the client system 3. In this case, the image editor 203b uses the technique in which materials are arranged and superimposed on one another without completely expanding compressed image information. The technique disclosed in Unexamined Japanese Patent Publication HEI 11-331847 can be applied to this technique. The image register 203c performs processing for registering image information provided from the client system 3. Table 1 stores characteristic information for characterizing materials, for example, some keywords each which is provided with respect to material number uniquely allocated for each of the materials expressed by image information stored in the display image information storage 206 or print image information storage 207. Table 1 further holds the similar information with respect to the template stored in the template information storage 205. The specific example of table T1 will be described later.

The storage 204 is connected to the main controller 202, and stores a Java applet group including a plurality of different Java applets and a user edition AP204b. The Java applet group includes a Java applet 204a, which is distributed to the client system 3 and executed so as to support the layout operation at the client system 3. The Java applet is a kind of programs using Java language developed by Sun Microsystems. The Java applet is executed by a web browser in which Java Virtual Machine (hereinafter referred to as Java VM) is embedded.

The user edition AP204b is an application program downloaded onto the client system 3. This application program is executed by the client system 3 to implement an environment in which image information is obtained through not only the server 2 but also the plurality of paths to perform the layout operation on the same screen page with respect to the image expressed by these obtained image information.

The template information storage 205 stores template information serving as sample forms in the layout generation processing of client system 3. The template includes image information such as frame information and background. A template number is uniquely given to each template.

The display image information storage 206 stores image information (hereinafter referred to as "display image information") of material displayed on the display device of the client system 3 at the time of the layout operation processing. The print image information storage 207 stores image information hereinafter referred to as "print image information") of material used when the server 2 performs edit processing. In the display image information storage 206 and print image information storage 207, image information that expresses the same material is held respectively. The difference between display image information and print image information is a difference in an amount of information. Namely, even if the same material is used, display image information has a small amount of information as compared with print image information. Then, in the case where such information is displayed, the size of image occupied on the screen page is small. This is because no load is put on the system when the layout operation is carried out by the client system 3. In display image information, thumbnail can be applied. While, print image information is generally held in the print image information storage 207 in the form that is based on the compression format such as JPEG (Joint Photographic Expert Group), GIF (Graphic Interchange Format).

The main parts of server 2 can be configured by the so-called computer system. For this reason, the communication controller 201, main controller 202, and image processor 203 can be implemented when a CPU (Central Processing Unit) executes a predetermined program. More specifically, a program recorded on a storage medium such as CD-ROM (Compact Disk-Read-Only Memory) 208 or a program supplied via the network is stored in an arbitrary memory area, and CPU performs processing according to this program to make it possible to implement various kinds of processing.

<Configuration of Client>

The configuration of client system 3 will be explained. The client system 3 is composed of a communication controller 301, Web browser 302, print controller 303, printer 304, input device 305, display device 306, image file 307, character font file 308, and image input device 309.

The communication controller 301 is provided between the network 5 and web browser 302, and performs communication control according to a predetermined protocol in order to transmit and receive various kinds of data. The Web browser 302 includes Java VM 302a having a function of executing a Java applet. In connection with Web browser 302, "Internet Explore" by Microsoft or "Netscape Navigator" by Netscape can be applied. Various kinds of processing, which are implemented by executing Java applet 204a and user edition AP204 supplied from the server 202, will be described later.

The print controller 303 converts edit image supplied from the Web browser 302 into print data suitable for the specification of printer 304. Then, the printer controller 303 supplies the conversion result to the printer 304. The printer 304 prints the edit image converted into print data and output it. The printer 304 is capable of printing a sheet of paper with a size that the client of the client system 3 wishes, and a color printer is applicable thereto. The input device 305 receives an instruction from the operator of client system 3. The input device 305 is composed of a mouse, keyboard, pen-input device, which are appropriately combined. The display device 306 displays the template and display information with respect to the operator of client system 3. In connection with the display device 306, a flat panel display such as LCD (Liquid Crystal Display) can be used.

The image file 307 stores original image information generated by the client system 3 and image information scanned by a scanner.

The character font file 308 stores information relating to the original character font generated by the client system 3 and various kinds of character fonts obtained via the other apparatus and network 5.

The image input device 309 is a device for inputting an image, which is not stored in the image file 307, and a canner, a digital camera, and the like can be used.

The main parts of client system 3 can be configured by the so-called computer system. For this reason, the communication controller 301, Web browser 302, and print controller 303 can be implemented when the CPU executes a predetermined program. More specifically, a program recorded on a storage medium such as CD-ROM 310 or a program supplied via the network is stored in an arbitrary memory area, and CPU performs processing according to this program to make it possible to implement the main processing of client system 3.

<Photo Sharing System>

The configuration of photo sharing system 4 will be explained. The photo sharing system 4 is composed of a communication controller 401, main controller 402, public image information storage 403, and private image information storage 404.

The communication controller 401 is provided between the network 5 and main controller 402, and performs communication control according to a predetermined protocol in order to transmit and receive various kinds of data. The main controller 402 performs control in such a way to provide public image information to the client system 3 that requests the provision of image information at any time or to provide private image information after recognizing the operator of the client system 3 by performing predetermined authentication-processing. At the time of providing information, control for causing confirmation to be carried out using image information with the amount of data that put no load on the client system 3 such as thumbnail is performed before providing image information as such.

The public image information storage 403 stores public image information unconditionally provided to the request source that requests the provision of image. The private image information storage 404 stores a user registered in advance and image information after ensuring security every such a user.

The following example can be explained as a use form of public image information storage 403:

Namely, this is useful for photographers or CG (Computer Graphics) creators, who have the advanced technique among the armatures but have no proficiency in generating the so-called homepage such as HTML (Hyper Text Makeup Language), to post their works on the network 5. Also, this is useful for persons, who have no opportunity to sell their works for the reason of limitation given by the manager (provider) who provides and mages the homepage. Moreover, this is suitable for the case in which those persons give a high priority to the completion of their works than to the generation of homepage.

Still moreover, image information (work), which shows the similar tendency, is easily collected for the reason of a "photo" sharing, so that evaluation of image information is possible. Or, there is a possibility that the work will be subjected to critic's evaluation, which can be little obtained in the individual homepage.

As a use form of private image information storage 404, the user or group registered uses it as a photo album.

<Entire Operation of Edit Image Distributing System>

Figure 2:
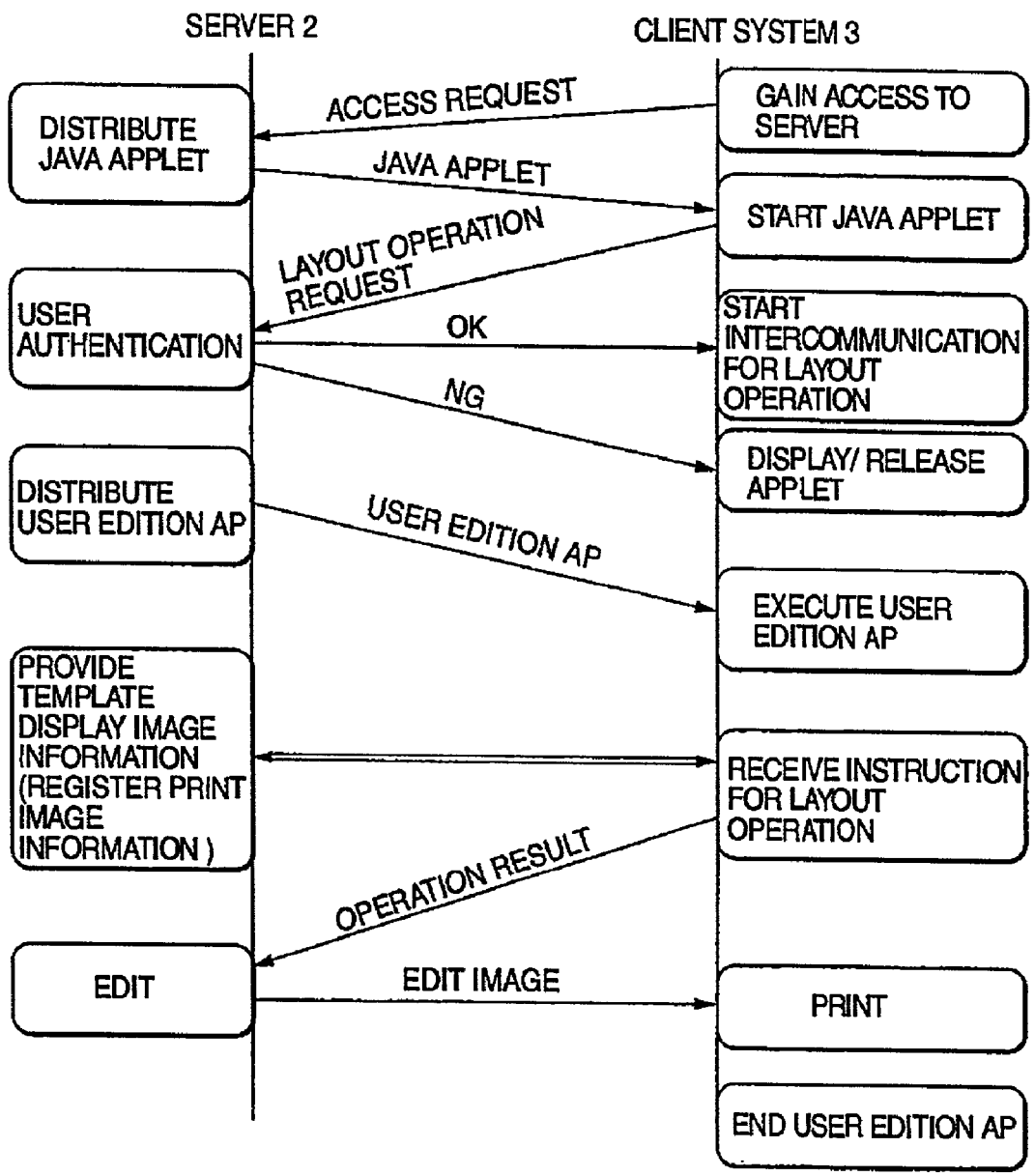
FIG. 2 is a block diagram to explain a status transition of data transmission/reception between a server of this edited image distributing system and a client's system.

The outline of the entire operation of edit image distributing system, particularly, data to be transmitted/received between the server 2 and client system 3 each having the aforementioned configuration, will be explained with reference to FIG. 2. Note that the specific operation of each of the server 2 and client system 3 will be described later.

First, an access request is transmitted to the server 2 from the client system 3. The server 2 reads Java applet 204*a* stored in the storage 204 in response to this access request, and distributes the read Java applet 204*a* to the client system 3, which is the access request source.

The client system 3 that has received the Java applet 204*a* starts the Java applet 204*a* and executes it using Java VM 302. In this embodiment, after executing the Java applet 204*a*, processing for user authentication is executed. For example, the client system 3 provides instructions of a request for starting the layout operation (layout operation request) to the server 2, and inputs a password allocated as a client in advance and transmits it thereto. The server 2 determines whether or not the operator of the client system 3 that requests the start of layout operation is a regular client (user registered in advance) and sends the determination result.

In the case where the operator is not the regular client, the result is displayed on the display device 306 of client system 3 and the distributed applet is released. In the case where the operator is the regular client, the user edition AP204*b* is distributed to the client system 3 by the server 2. I the client system 3 downloads the user edition AP204*b* and executes it, whereby constructing processing environment for layout operation.

When the client system 3 receives the layout operation instructions, data transmission and reception between the Java applet 204*a*, which is executed by the client system 3, and server 2 is carried out many times as required. For example, a material condition input from the input device 305 of the client system 3 is sent to the server 2. The server 2 detects display image information indicating material having high degree of coincidence of characteristic information (keyword) with respect to this material condition, and transmits the detection result to the client system 3. Such processing will be specifically described in the explanation of the operation of server 2.

When the layout operation is completed in the client system 3, notification of this completion is sent to the server 2. The server 2 receives this notification together with the result of layout operation, and edits print image information according to the operation result. The edit image generated by this edit processing is transmitted to the client system 3. The client system 3 prints the edit image and ends the user edition AP204*b*.

Note that "release of Java applet" means that the Web browser 302 stops the execution of Java applet instead of the fact that the client system 3 sends the Java applet to the server 2.

The above explains the entire operation of the edit image distributing system 1 and the operation transition.

<Operation of Server>

Various operations of server 2 will be explained with reference to the drawings.

The main operation of server 2 is largely divided into the distribution of Java applet 204*a* and user edition AP204*b* (including user authentication) and various support processing with respect to the client system 3 that executes user edition AP204*b*.

Figure 3:
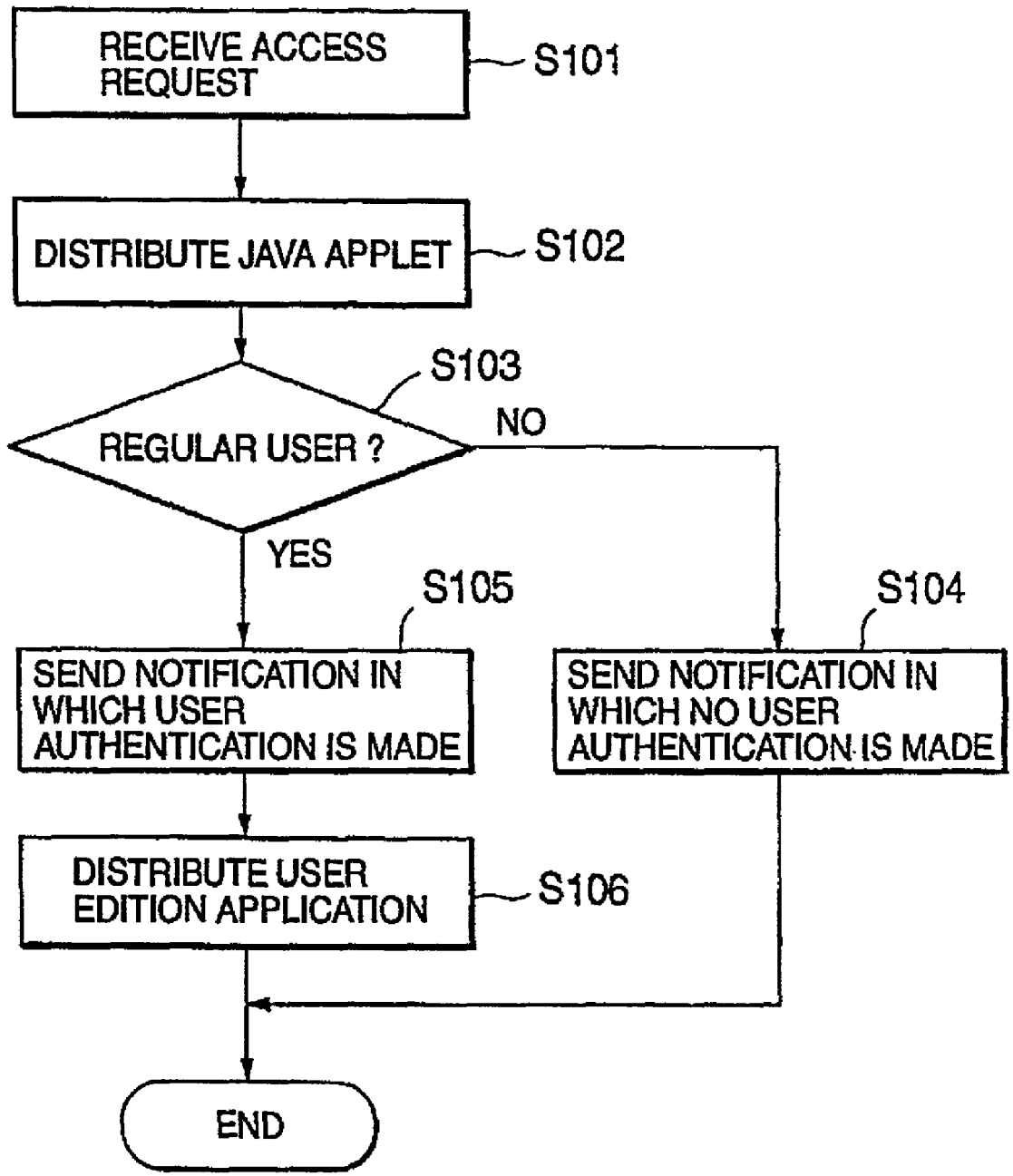
FIG. 3 is a procedure explanatory view to explain the entire operation of server.

First, the entire operation of server 2 will be explained with reference to FIG. 3.

When receiving the access request from the arbitrary client system 3 via the network 5, the communication controller 201 notifies the main controller 202 of the received access request (step S101). The main controller 202 reads a predetermined Java applet 204*a* from the storage 204 according to the notified access request, and distributes the read applet 204*a* to the client system 3 as the access request source via the communication controller 201 (step S102).

After that, when receiving a request for performing the layout operation from the client system 3 that executes the Java applet 204*a* via the communication controller 201, the main controller 202 performs user authentication processing in order to determine whether or not the operator, who operates the client system 3 as the request source, is a regular user. To that end, there is generally used such a technique that the Java applet 204*a* is structured in such a way to obtain the transmission of password allocated to the user registered in advance together with the request for the layout operation and judgment is performed based on the received password. Note that the registered user name and password are stored in a predetermined storage area of the storage in advance (not shown).

In the case where the operator, who requests the layout operation, is not the regular user (step S103: NO), the main controller 202 notifies the client system 3 as the request source that the user registration is not performed via the communication controller 201 (step S104). Additionally, in FIG. 3, processing is ended after notification, but processing for registering a new user may be continued without ending the processing.

In the case where the operator is the regular user (step S103; YES), the main controller 202 notifies the client system 3 as the request source that the user authentication is correctly performed via the communication controller 201 (step S104). After that, the main controller 202 and image processor 203 transmits user edition AP204b to the client system 3, and performs various processing for supporting the layout operation in the client system 3 that has executed the user edition AP204b (step S106).

An explanation will be next given of various processing for supporting the layout operation executed by the main controller 202 and image processor 203.

First, steps of processing for providing/searching template/display image information will be explained with reference to FIGS. 4 and 5.

When receiving a provision request relating to the template and display image information via the communication controller 201, the main controller 202 sends this request to the image searcher 203a of image processor 203 (step S201). The image searcher 203a determines whether or not the received request is a search request where the keyword is indicated (step S202). When it is the request where template number or material number is indicated (step S202: NO), the image searcher 203a determines that the received request is not the search request. When the template number is attached to the request, the image searcher 203a reads template information corresponding to this number from the template information storage 205. When the material number is added to the request, the image searcher 203a reads display image information corresponding to this number from the display image information storage 206 (step S203).

The image searcher 203a sends read template information and/or display image information to the main controller 202. The main controller 202 transmits template information and/or display image information to the client system 3 as the request source via the main controller 202 (step S204).

When the received request is the search (step S202: YES), the image searcher 203a performs searching according to the condition of search attached to this request (step S205).

Here, the specific examples of keyword searching will be explained.

FIGS. 5A and 5B are examples of tables stored in Table T1. FIG. 5A is an example in which keywords showing the characteristics of material are recorded onto material numbers #1, #2, #3 . . . allocated to the respective materials. FIG. 5B is an example in which keywords showing the characteristics of template are recorded onto template numbers #T1, #T2, #T3 . . . allocated to the respective templates. When keywords "background" "summer" "maintain" are attached to the search request as material searching conditions, the image searcher 203a specifies material number #3 (searching result) recorded as a keyword indicating the characteristics of three conditions with reference to the table of materials illustrated in FIG. 5A. The image searcher 203a reads display image information corresponding to material number #3 from the display image information storage 206, and sends it to the main controller 202. When the conditions for searching template are attached to the search request as searching conditions, the image searcher 203a performs the similar processing with reference to the template table of FIG. 5B.

The above search processing is just one example. In addition to this, numerical values indicating priorities are assigned to the keywords registered in table T1 and one with the high total of the numerical values of the corresponding keywords may be used as a searching result. Moreover, a plurality of materials/templates may be sent to the main controller 202 in decreasing order of priority in place of detecting one material/template as a searching result. Still moreover, the priorities are assigned to the searching conditions themselves and the material/template that satisfies the condition with high priority may be searched.

The detected material and/or template are sent to the main controller 202 (step S206: YES), and the main controller 202 transmits the sent material and/or template to the client system 3 as the request source (step S204).

In the case where the material and/or template, which satisfies the search condition, is not detected (step S206: NO), the notification that the material and/or template corresponding to the condition is not stored is provided to the main controller 202 from the image searcher 203a. The main controller 202 transmits information indicating this fact to the client system 3 as the request source via the communication controller 201.

Thus, the aforementioned processing steps make it possible to provide the display image information and/or template that the client system 3 wishes to the client system 3.

Figure 7:
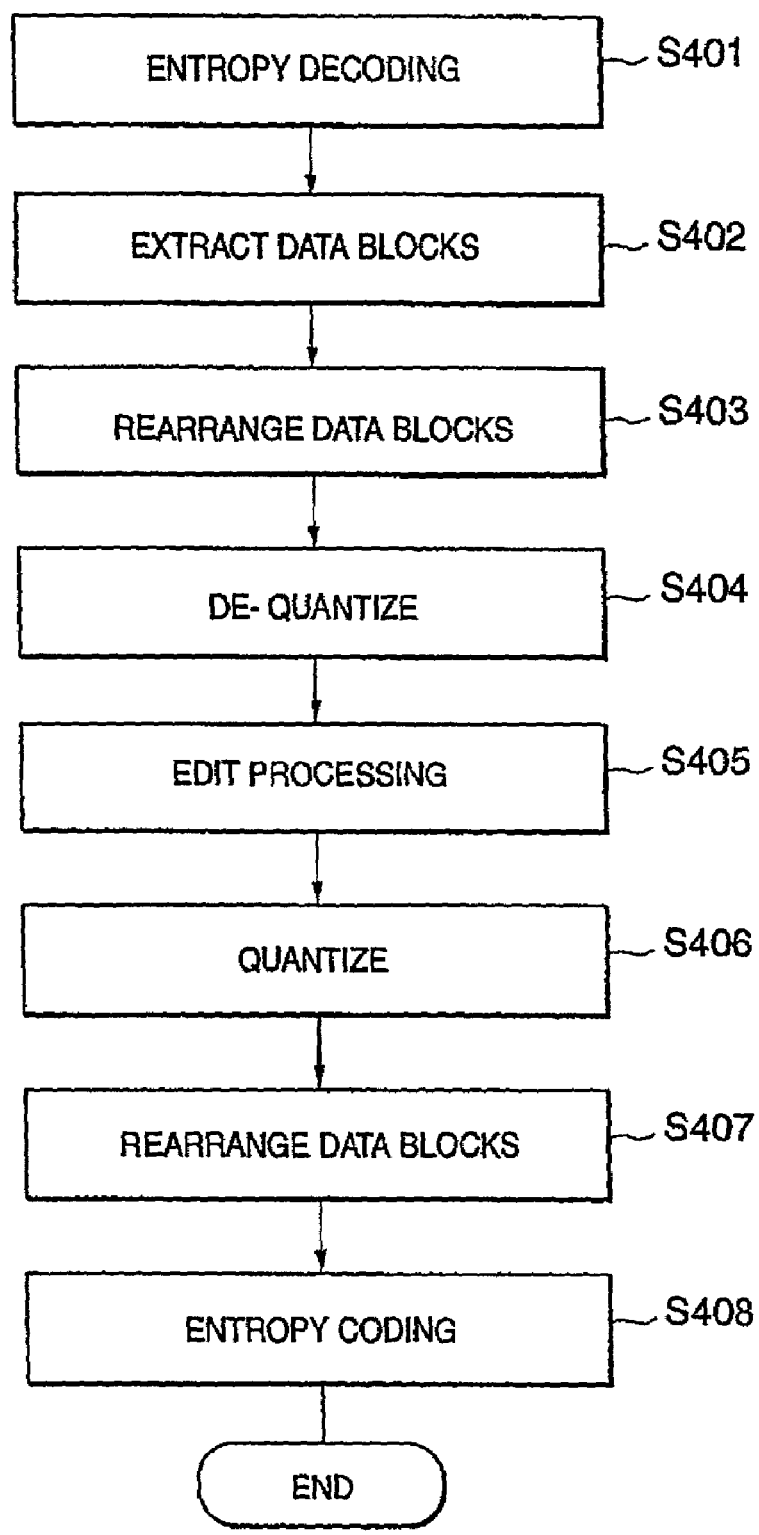
FIG. 7 is a procedure explanatory view to explain the server editing processing.

An explanation will be next given of the steps of edit processing according to the reception of operation result with reference to FIGS. 6 and 7.

First, the communication controller 201 receives the operation result obtained by operating the transmitted display image information via the network 5, and notifies the main controller 202 of this operation result (step S301). The main controller 202 notifies the image editor 203b of this operation result. The image editor 203b reads print image information, which expresses the same material as the display image information transmitted to the client system 3, from the print image information storage 207 (step S302).

In the present embodiment, there is a case in which image information, which is not stored in the server 2, is included in the image information subjected to the layout operation by the client system 3. For example, there is a case in which at least one of image information indicating the original image stored in the image file 307, image information input from the image input device 309, image information provided from the photo sharing 4 is included therein. In this case, image information, which is used with the operation result, is sent or registration processing of image information is performed. For this reason, in some cases, image information, serving as print image information, sent from the client system 3 is supplied to the image editor 203b from the main controller 202 and the image editor 203b reads print image information registered from the print image information storage 207.

The image editor 203b edits print image information according to the operation result in the intermediate process in which read or received print image information is decompressed (step S303). In this edition, move processing, enlargement processing, reduction processing, deletion processing are provided to print image information. Moreover, such processing that superimposes a plurality of materials on one another is required depending on the operation result. In this case, the image editor 203b edits print image information in such a way to reflect the superimposing of materials according to information (Z-Order) defined on the axis perpendicular to the screen. The image editor 203b further encrypts the edit image generated by edition and send the resultant to the main controller 202 (step S304). The main controller 202 transmits the edit image to the client system 3 via the communication controller 201 (step S305).

Here, an explanation will be given of the processing in step S303 with reference to FIG. 7. This processing is edit processing executed by the image editor 203b.

First, print image information, which is the compressed image defined by data block based on a plurality of primary conversions, is subjected to entropy decoding to extract data blocks based on the plurality of primary conversions (steps S401, S402).

After that, the extracted data blocks are rearranged and dequantized (steps S403, S404). Whereby, the compressed image is decompressed up to the intermediate stage even if the compressed image is not completely decompressed. Then, edit processing is carried out (step S405). The edit image generated by the edit processing is quantized and the data blocks are rearranged, and entropy coding is provided thereto (steps S406, S407, S408).

Thus, the aforementioned processing steps make it possible to provide move processing, enlargement processing, reduction processing, deletion processing to print image information without decompressing the compressed image completely, namely, in the intermediate stage in which the compressed image is decompressed.

Figure 8:
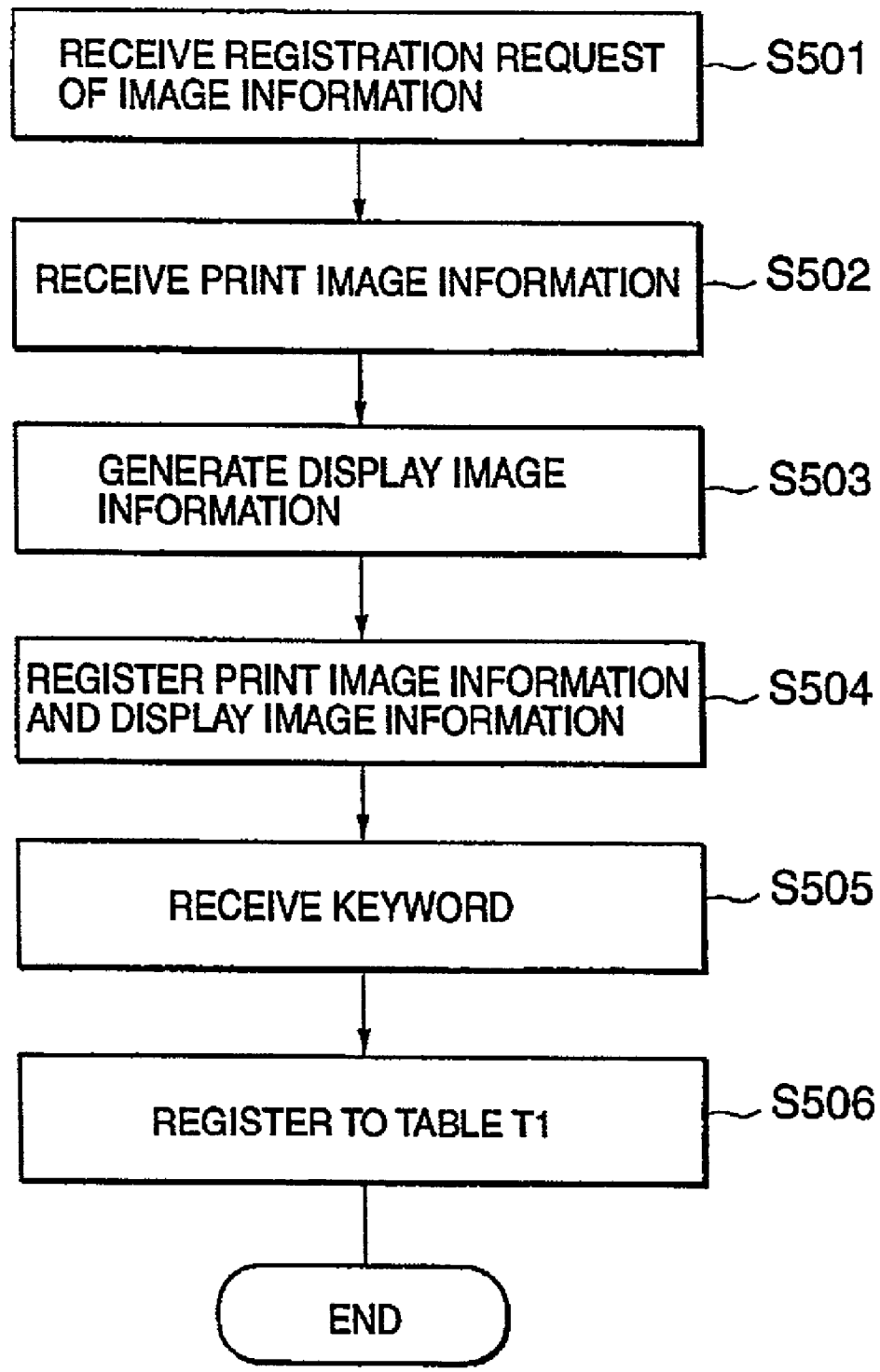
FIG. 8 is a procedure explanatory view to explain the server image information registration processing.

An explanation will be next given of steps of processing for registering image information with reference to FIG. 8.

In the case where the layout operation using image information, which is not stored in the server 2, is performed in the client system 3, a request for registering this image information to the server 2 is received from the client system 3 in some cases. The main controller 202 receives this request via the communication controller 201 (step S501). Here, when receiving no image information to be registered, the main controller 202 requests the client system 3 as the request source to provide image information, and receives it (step S502). The main controller 202 sends the received image information to the image register 203c. The image register 203c generates display image information, which expresses the same material as this image information and which has small amounts, using image information sent from the main controller 202 (step S503).

After that, the image register 203c uses image information sent from the client system 3 as print image information, and stores this print image information and generated display image information in the display image information storage 206 and print image information storage 207, respectively (step S504). In this case, the image register 203c adds a new material number common to the respective image information thereto.

While, after sending image information to the image register 203c, the main controller 202 requests the client system 3 as the request source to transmit a keyword/keywords indicative of the characteristic of material expressed by this image information. One or the plurality of keywords sent from the client system 3 is transmitted to the image register 203c (step S505). The image register 203c associates the material number previously added with the received keyword and newly registers it onto Table 1 (step S506).

Thus, the registration of image information to the server 2 from the client system 3 is carried out through the aforementioned processing steps. Note that a password may be added to image information to be registered such that only the client can use image information. In this case, it is necessary to provide such processing that only the client of client system 3 can use this image information at the time when image information is stored in the display image information storage 206 and print image information storage 207 in step S504 and when the new registration to Table 1 is performed in step S506.

Moreover, in connection with timing at which the registration processing is started, there is a case in which the registration is started in response to the registration request from the client as mentioned above. There is another case in which the registration is executed in response to the reception of operation result. This case is generally the same as the processing steps as mentioned above, and the explanation is omitted. Still moreover, the main controller 202 and image register 203b may be structured such that the similar registration processing can be provided to not only image information but also the template. In this case, the template for image information, template information storage 205 for display image information storage 206 and print image information storage 207 may be used in the aforementioned processing steps, and processing for generating display image information in step 503 may be omitted.

Furthermore, in the aforementioned processing steps, display image information is generated based on the image information sent from the client system 3. However, display image information may be also supplied from the client system 3 so as to omit the processing for generating display image information.

<Operation of Photo Sharing System>

Figure 9:
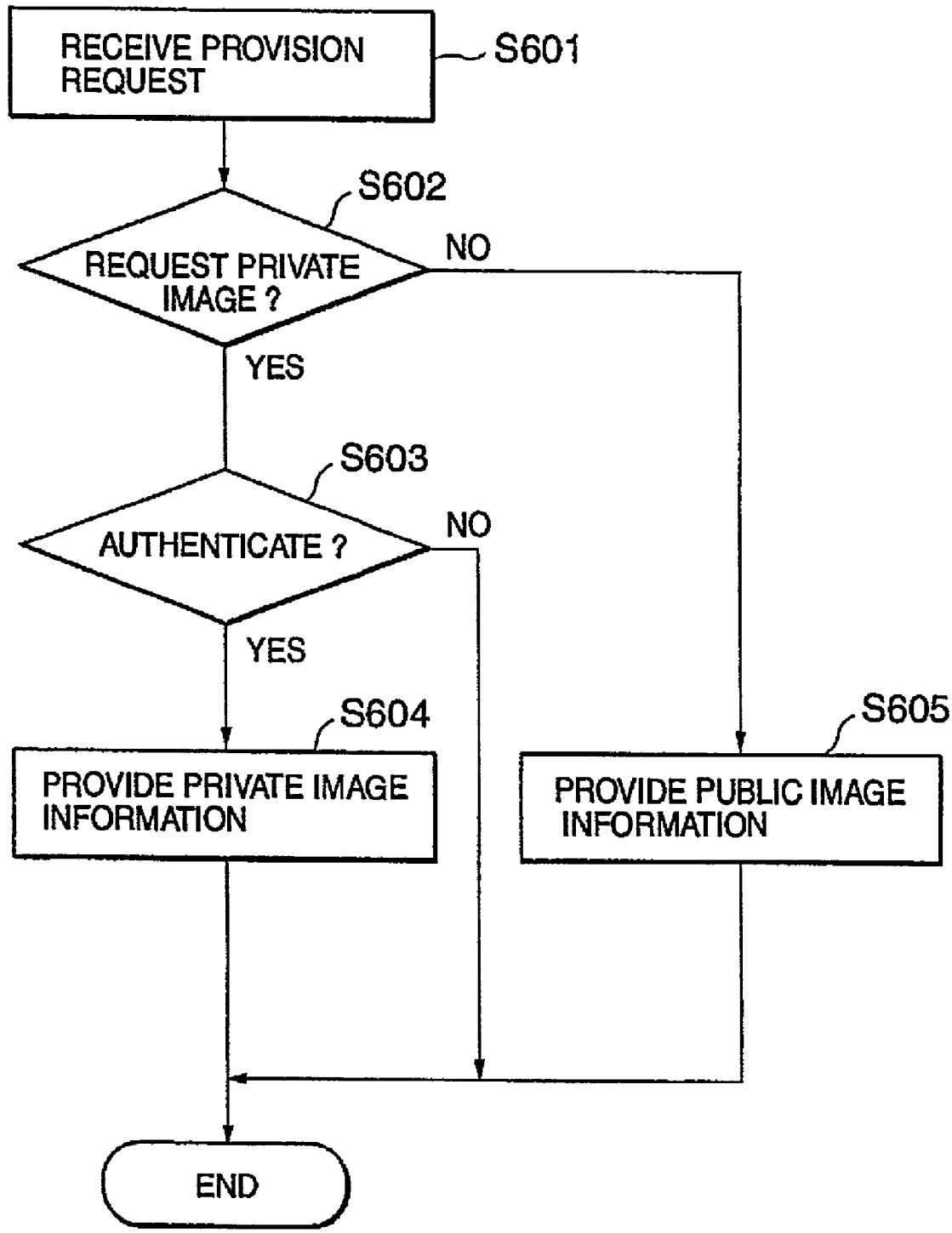
FIG. 9 is a procedure explanatory view to explain the entire operation of a photo sharing system.

An explanation will be next given of the operation of photo sharing system 4 with reference to FIG. 9.

When the main controller 402 of photo sharing system 4 receives a provision request relating to image information via the communication controller 401, the main controller 402 determines whether or not the provision request is one relating to the private image (steps S601, S602).

In the case where the provision request is one relating to the private image (step S602: YES), the main controller 402 performs authentication as to whether or not the request source is the user registered in advance or whether or not the request source is the user to whom the private image requested may be provided (step S603). In the case where the authentication is correctly performed (step S603: YES), the main controller 402 performs processing for providing the requested image to the request source (step S604).

More specifically, a plurality of image information directed to the user held in advance is transmitted to the client system 3 by use of image information with low resolution such as thumbnail. In this case, only the image selected by the client system 3 is transmitted to the client system 3 as private image information that is expressed with the original resolution. While, in the case where the authentication is not correctly performed (step S603: NO), the main controller 402 notifies the client system 3 as the request source of this result, and processing is ended.

In the case where image information, which the client system 3 requests, is not private image information (step S602: NO), the main controller 402 determines that the requested image is a public image. Then, the main controller 402 reads the requested public image information from the public image information storage 403, and transmits it to the client system 3 as the request source via the communication controller 401 (step S605). In this case, it is also preferable that image information be selected by the client system 3 using the thumbnail.

<Operation of Client System>

An operation will be next given of various kinds of operations of client system 3 with reference to the drawings.

Figure 10:
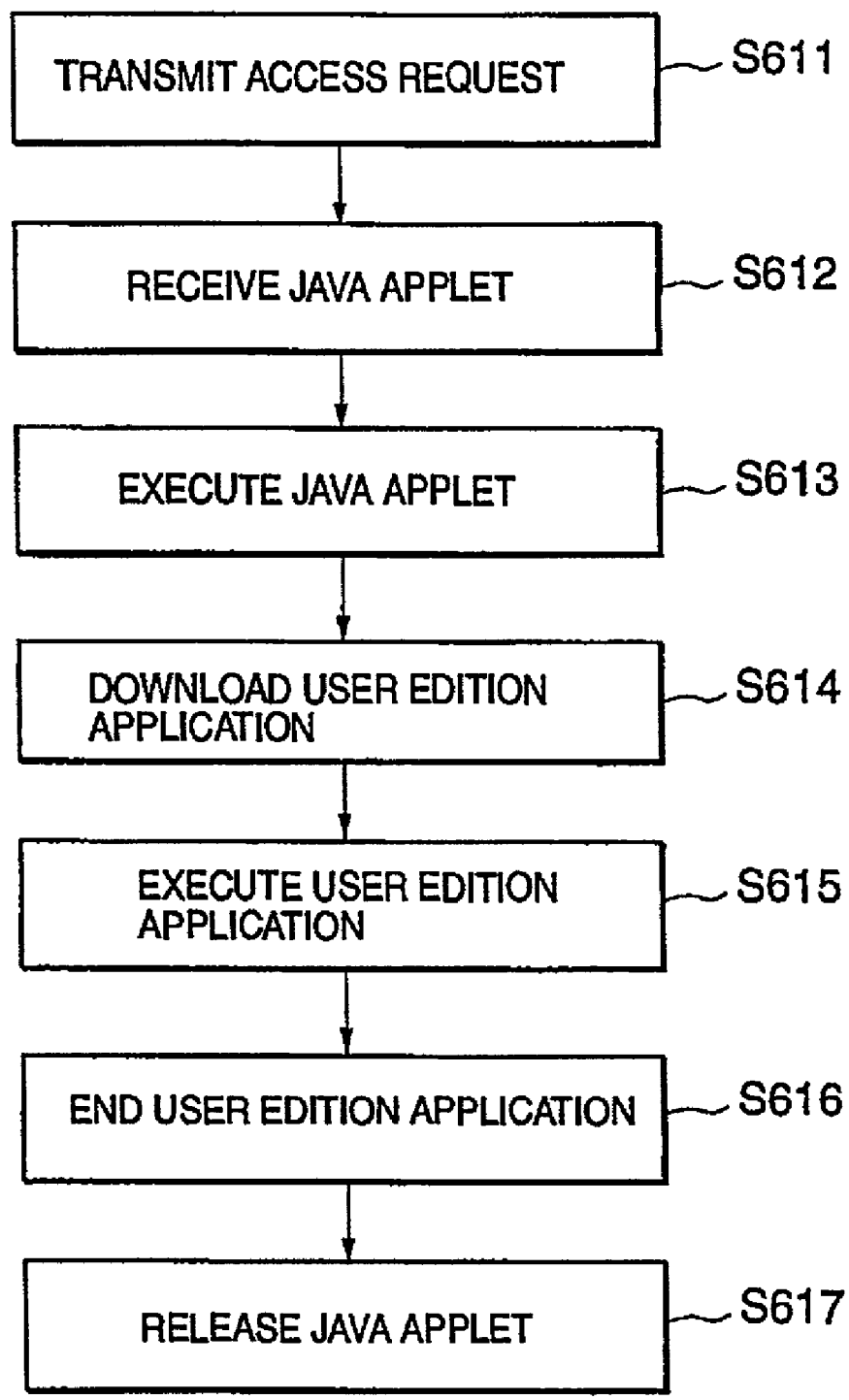
FIG. 10 is a procedure explanatory view to explain the entire operation of client system.

First, the entire operation of client system 3 will be explained with reference to FIG. 10.

When receiving the access operation to the server 2 from the operator of the client system 3, the input device 305 notifies the Web browser 302 of the received access operation. The Web browser 302 transmits the access request to the server 2 via the communication controller 301 (step S611). When receiving the Java applet 204a sent from the sever 2 in response to this access request, the Java VM 302a of Web browser 302 executes the received Java applet 204a (steps S612, S613).

When the Java applet 204a is executed, the operator of client system 3 is inquired about the execution of downloading the user edition AP 204b into the client system 3. When the operator agrees to the execution of downloading, the user edition AP 204b is started to be downloaded into the client system 3 (step S614).

When the user edition AP 204b is executed on the client system 3 after downloading, the two-way communication between the user edition AP204b and server 2 is carried out to support the layout operation afterward (step S615). When the necessary layout operation and the edit image printing are completed in the client system 3, the user edition AP204b is ended and the Java applet 204a is released (step S616 and S617).

Figure 11:
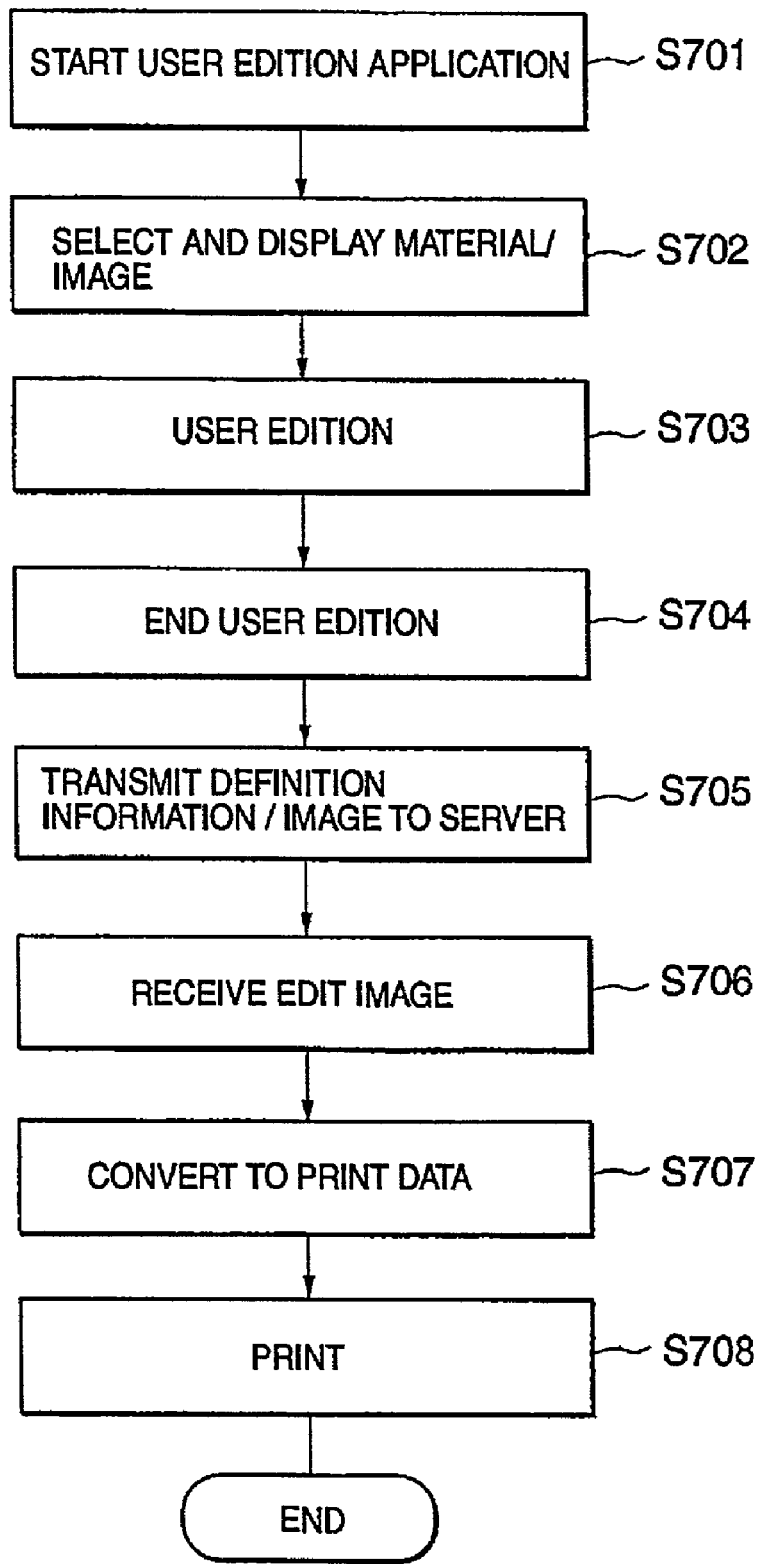
FIG. 11 is a procedure explanatory view to explain the operation of user edition AP executed in the client system.

An explanation will be next given of the operation of client system 3 at the time when the user edition AP204b is executed on the client system 3 with reference to FIG. 11. Note that the user edition AP used in the operation of the client system 3 to be explained afterwards indicates one that is downloaded into the client system 3. The Java applet 204a executed on the client system 3 performs processing for helping various kinds of processing relevant to the layout operation and the printing of edit image at the time when this user edition AP is executed.

When the user edition AP is executed after downloading, information to confirm whether or not the layout operation is executed is displayed on the display device 306 (step S701). After that, when an instruction to perform the layout operation is input to the input device 305 from the operator, the user edition AP204b transmits a layout operation request to the server 2 via the communication controller 301.

In response to the layout operation request, two-way communication between the server 2 and client system 3 is performed to authenticate the user. Here, the operator of client system is required to input the password. In the case where the operator is not authenticated as a registered regular user in this user authentication processing, the user edition AP displays the failure in user authentication on the display device 306.

In the case where the operator is authenticated as a registered regular user, the user edition AP displays screen information on the display device 306 to request the server 2 to provide the template and material (display image information). The operator of client system 3 inputs the number that specifies the necessary template or material or the condition for searching. The user edition AP transmits the provision request of template/display image information to the server 2 together with input data. When receiving the template/display image information sent from the server 2 in response to the provision request, the user edition AP displays the template/display image information on the display device 306 (step S702).

Additionally, the user edition AP is structured in such a way to make it possible to repeat many times the transmission of such a provision request and the reception of the template/display image information in response thereto according to the instruction from the operator until the layout operation is ended.

After the displaying the template or display image information, the input device 305 receives the instruction for layout operation from the operator and notifies the user edition AP of the instruction (step S703).

The user edition AP processes display image information displayed on the display device 306 in response to the notified operation. In addition to this, the user edition AP changes definition information that defines the displayed material according to the operation, that is, processed display image information. For this reason, definition information shows the result of operation provided to the material by the operator. Such processing is carried out until the layout operation is ended (step S704).

Figure 12:
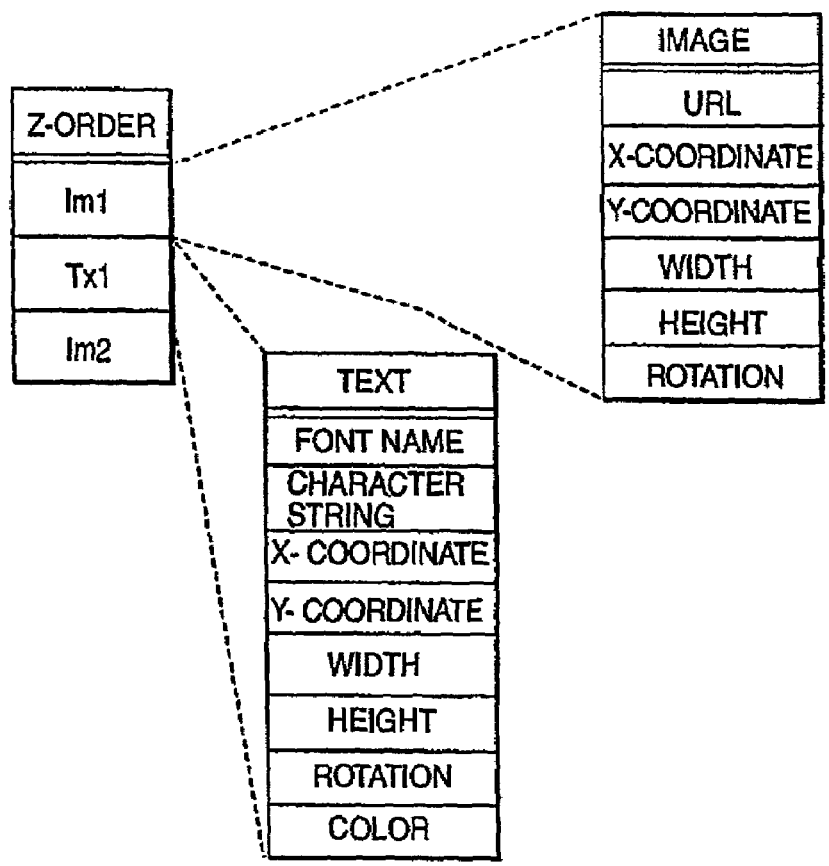
FIG. 12 is a view illustrating definition information generated in the client system.

An example of definition information is illustrated in FIG. 12. The same figure illustrates definition information relating to two images Im1 and Im2 and one text data Tx1. Definition information includes Z-Order of material to be used and specific data of each material and additional information (here, character font). In the case of character font, specific data includes information relating to a font name, displaying character string, X- and Y-coordinates showing the starting position of print (display), display width, height, rotation, and color. In the case of material, specific data includes information relating to URL (Uniform Resource Locator), X- and Y-coordinates showing the starting position of print (display), display width, height, and rotation. Note that FIG. 12 illustrates each item of only text Tx1 and image Im1 to simplify the display of drawing.

The explanation will be back to the processing steps of FIG. 11.

When receiving the instruction to end the layout operation from the operator, the input device 305 notifies the user edition AP of the received instruction. The instruction is executed by clicking, for example, a "print" button of area 501 shown in FIG. 12. The user edition AP transmits latest definition information to the server 2 (steps S704, S705).

In this case, when the pasting of character font onto display image information or the generation of underline is instructed from the operator, that is, the additional operation is performed, the user edition AP generates additional information in response this operation and holds it. Then, the user edition AP transmits definition information changed according to the operation to the server 2 as the operation result together with definition information of each material. Moreover, the image controller 304 transmits only the operation result to the server 2 when no print environment information 308a is detected. After that, the user edition AP waits for the transmission of edit image edited and generated according to the operation result transmitted from the server 2.

Note that "additional operation" is an operation for adding specific information to the material. For example, this includes an operation for pasting the character font to the upper or lower of the material and an operation for adding an under line to this character font. "Additional operation" means the character font and underline generated by such an additional operation.

When receiving the edit image from the server 2, the communication controller 301 sends the received image to the Java applet 204a (step S706). However, since the edit image is encrypted, the edit image must be subjected to decoding processing by the communication controller 301 or an encrypt processor (not shown). The user edition AP sends the edit image to the print controller 303. When additional information is generated and held according to the layout operation, the print controller 303 combines the edit image and this additional information. The print controller 303 converts the combined image into print data corresponding to the printer 304 and causes the printer 304 to print the edit image. Or, in the case where no additional information is sent, the print controller 303 converts the received image into print data corresponding to the printer 304 and causes the printer 304 to print the edit image (steps S707, S708).

The above has explained the entire operation of client system 3.

Figure 13:
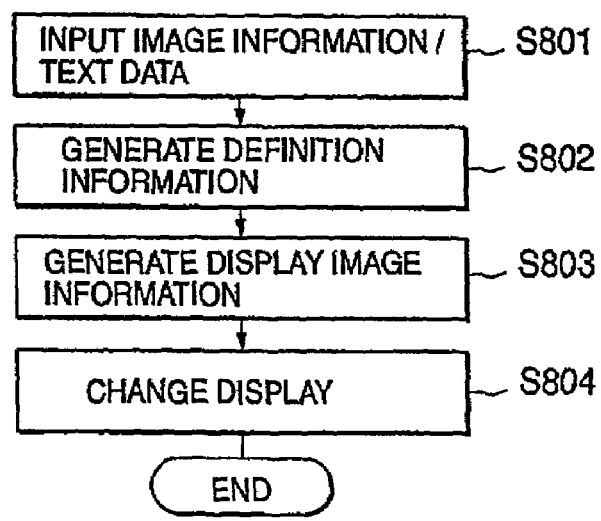
FIG. 13 is a procedure explanatory view to explain the processing of image information/text data obtained in the client system.

An explanation will be next given of processing steps of image information, which is not stored in the server 2, or text data generated in the client system 3 with reference to FIG. 13. When image information, which is not stored in the server 2, is used in the layout operation, steps in which 1) receive image information provided from the photo sharing system 4, 2) input image information using the image input device 309, 3) use image information stored in the image file 307 in advance are carried out as mentioned above.

Image information, which is not stored in the server 2, is first sent to the user edition AP (step S801). Image information generated on the client system 3 and text data are sent to the user edition AP in the same way. The user edition AP stores sent image information and text data onto the image file 307, character font file 308, respectively, and generates the corresponding definition information (step S802). Moreover, the user edition AP generates display image information from the input image information or text data (step S803). The user edition AP changes the screen page displayed on the display device 306 by use of display image information (step S804).

The aforementioned processing steps have been explained on the assumption that the original image information and text data will input at the layout operating time. However, they may be input at the time other than the layout operation. In this case, image information and text data have only to be stored onto the image file 307 or character font file 308 by the processor (not shown) other than the user edition AP. However, image information or text data stored in these files is used at the layout operating time, processing in steps S802 and S803 must be carried out.

Figure 14:
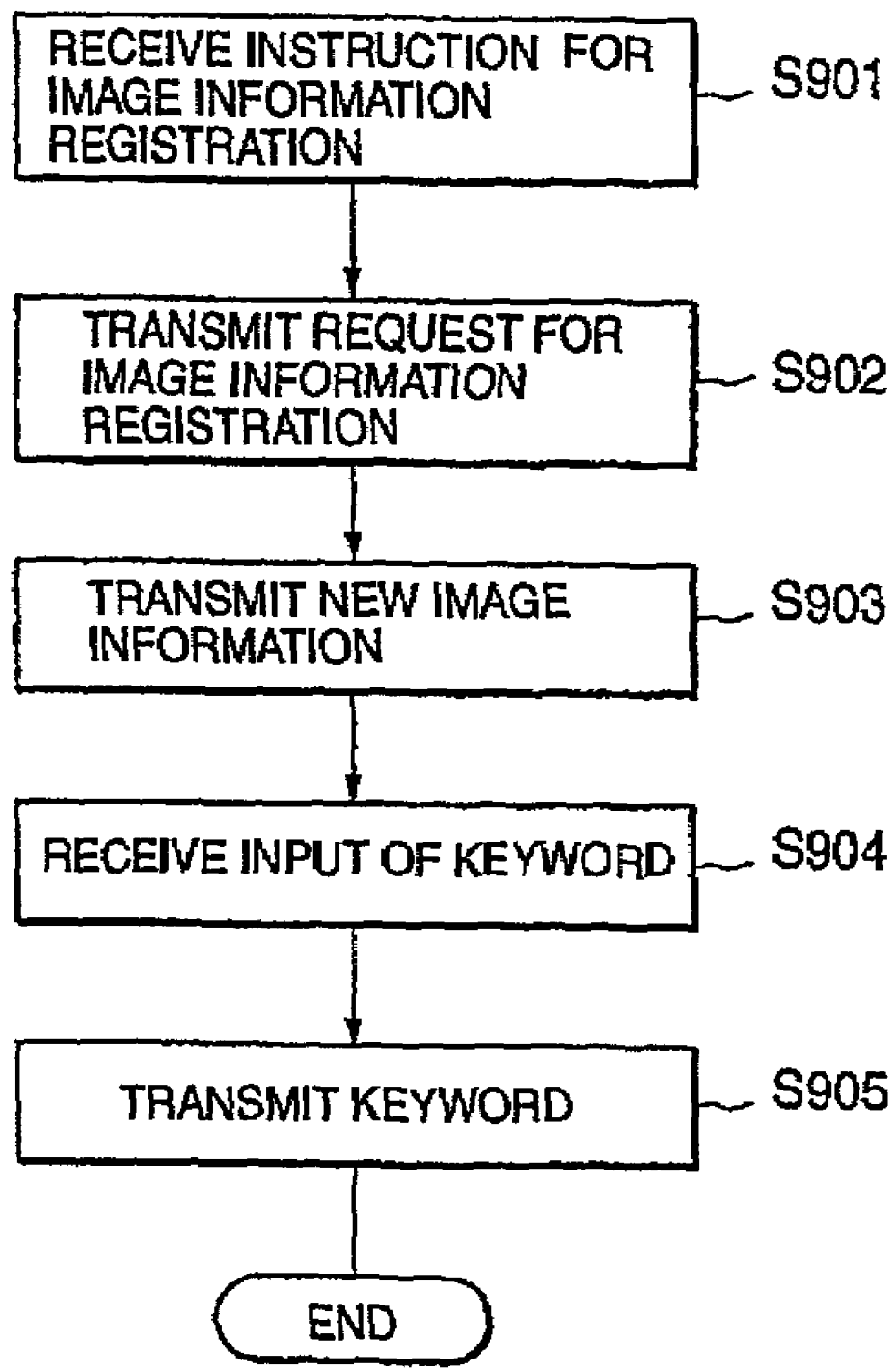
FIG. 14 is a procedure explanatory view to explain the processing for registering new image information to the server from the client system.

An explanation will be next given of the steps of processing for registering new image information to the server 2 with reference to FIG. 14.

When receiving an instruction to register image information from the operator, the input device 305 notifies the user edition AP of the received instruction (step S901). The user edition AP transmits the image information registration request to the server 2 in response to this notification (step S902). Moreover, the user edition AP transmits new image information instructed from the operator to the server 2 (step S903).

After that, the user edition AP displays screen page information, which is used to urge the operator to input the keyword that characterizes the material of image information to be registered, on the display device 306. One or more keywords received by the input device 305 are sent to the user edition AP (step S904). The user edition AP transmits the received keywords to the server 2 (step S905).

Thus, processing for registering image information input or generated in the client system 3 is carried out according to the aforementioned processing steps. Though only new image information is transmitted to the server 2 in the aforementioned processing steps, display image information may be generated in advance based on this image information in the client system 3 and this generated display image information may be transmitted to the server 2 simultaneously.

An explanation will be next given of examples of screen pages displayed on the display device 306 of client system 3 by executing the user edition AP with reference to FIGS. 15 to 30. In this embodiment, the operator operates the input device 305 at the layout operating time to make it possible to place the material at a desired position or add/delete the material.

The operations here include as follows:
1) Print environment operation (kind of printer, kind of paper, paper size, and printing method);
2) Template selection (image selection of frame and background)
3) Material selection (photo image, illustration image)
4) Character selection (font, size, color)
5) Character edition (insertion, movement, rotation, deletion)
6) Content edition (movement, rotation, enlargement, reduction, deletion)

The content is one that includes the character font and material.

Figure 15:
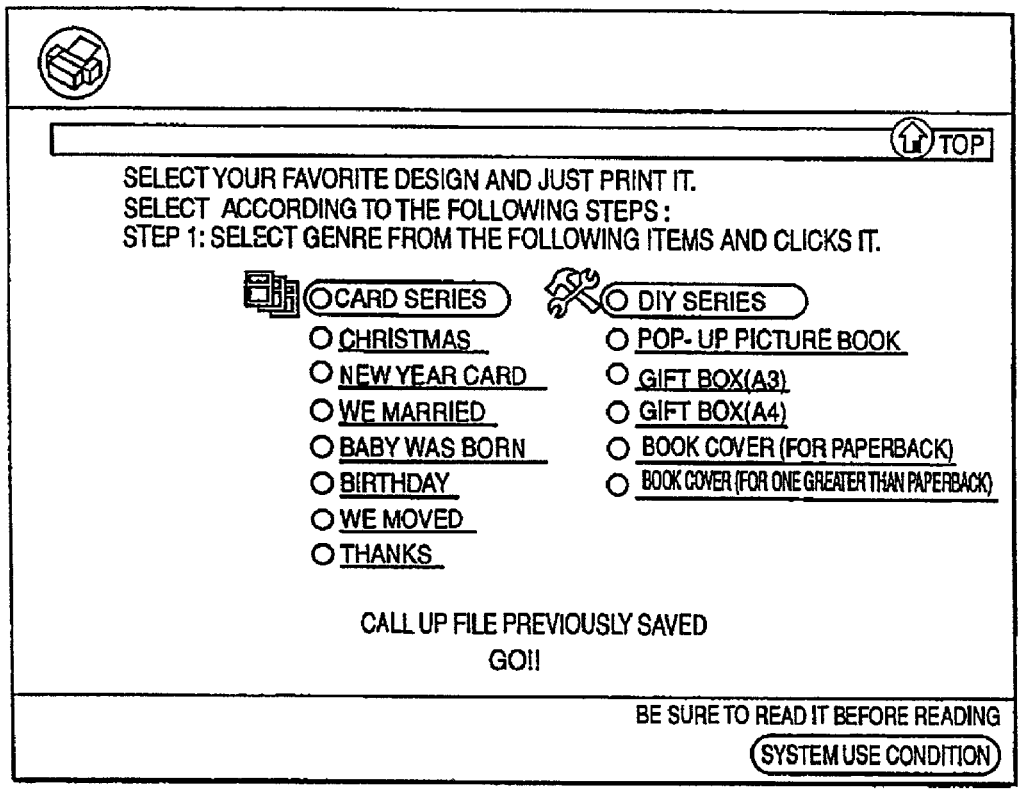
FIG. 15 is an example of screen page displayed on the display device of client system.
Figure 16:
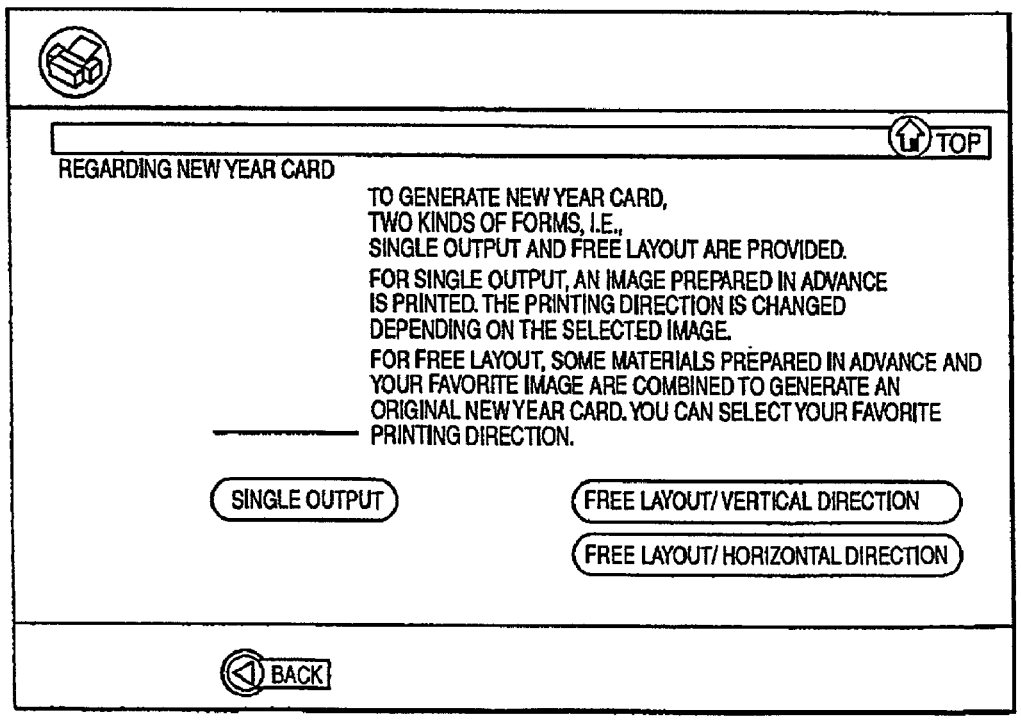
FIG. 16 is an example of screen page displayed on the display device of client system.

FIG. 15 is an example of a screen page displayed on the display device 306 when access to server 2 from the client system 3 is made. Here, it is possible to specify a card such as a Christmas card, New Year card and other print use form such as a book cover. Here, when the operator of client system 3 selects a New Year card, a screen page illustrated in FIG. 16 is displayed. This is the screen page to be subjected to specification of the layout direction (vertical or horizontal direction).

Figure 17:
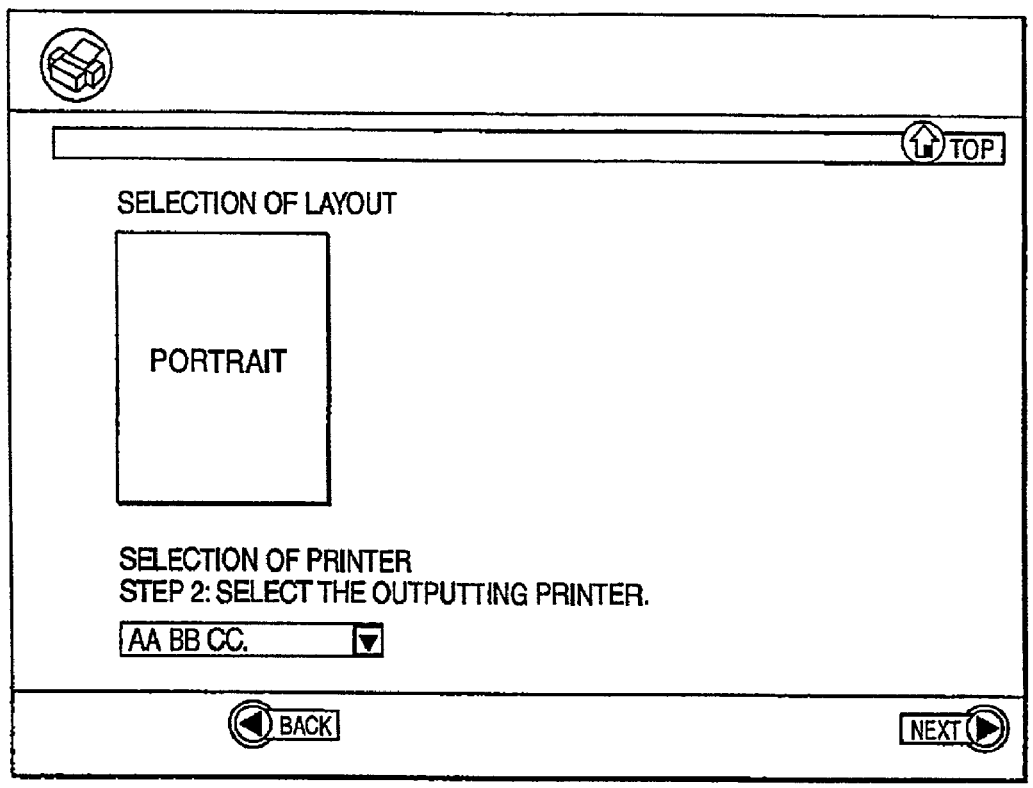
FIG. 17 is an example of screen page displayed on the display device of client system.
Figure 18:
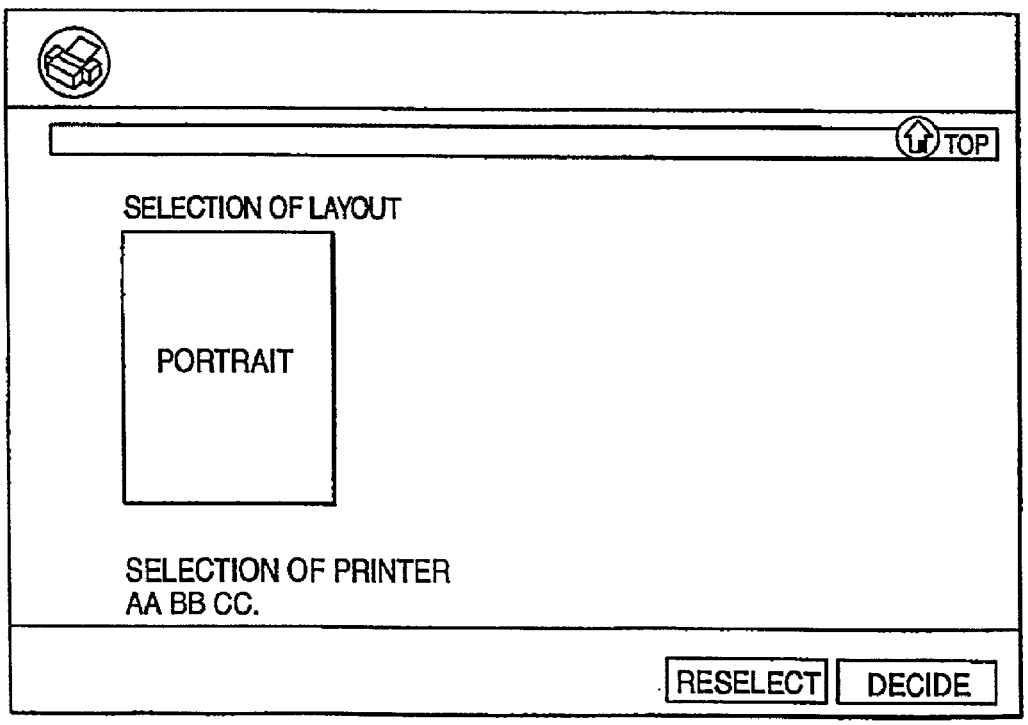
FIG. 18 is an example of screen page displayed on the display device of client system.

Moreover, in FIG. 16, when the vertical direction of free layout is selected, a screen page illustrated in FIG. 17 is displayed. This is the screen page to confirm the selection of the layout direction and to be subjected to specification of using printer 304 as illustrated at the lower left portion on the page. Here, when the operator selects a desired model of printer 304, a confirmation screen page illustrated in FIG. 18 is displayed. According to this screen page, a "decision button" at the lower right portion may be depressed.

Figure 19:
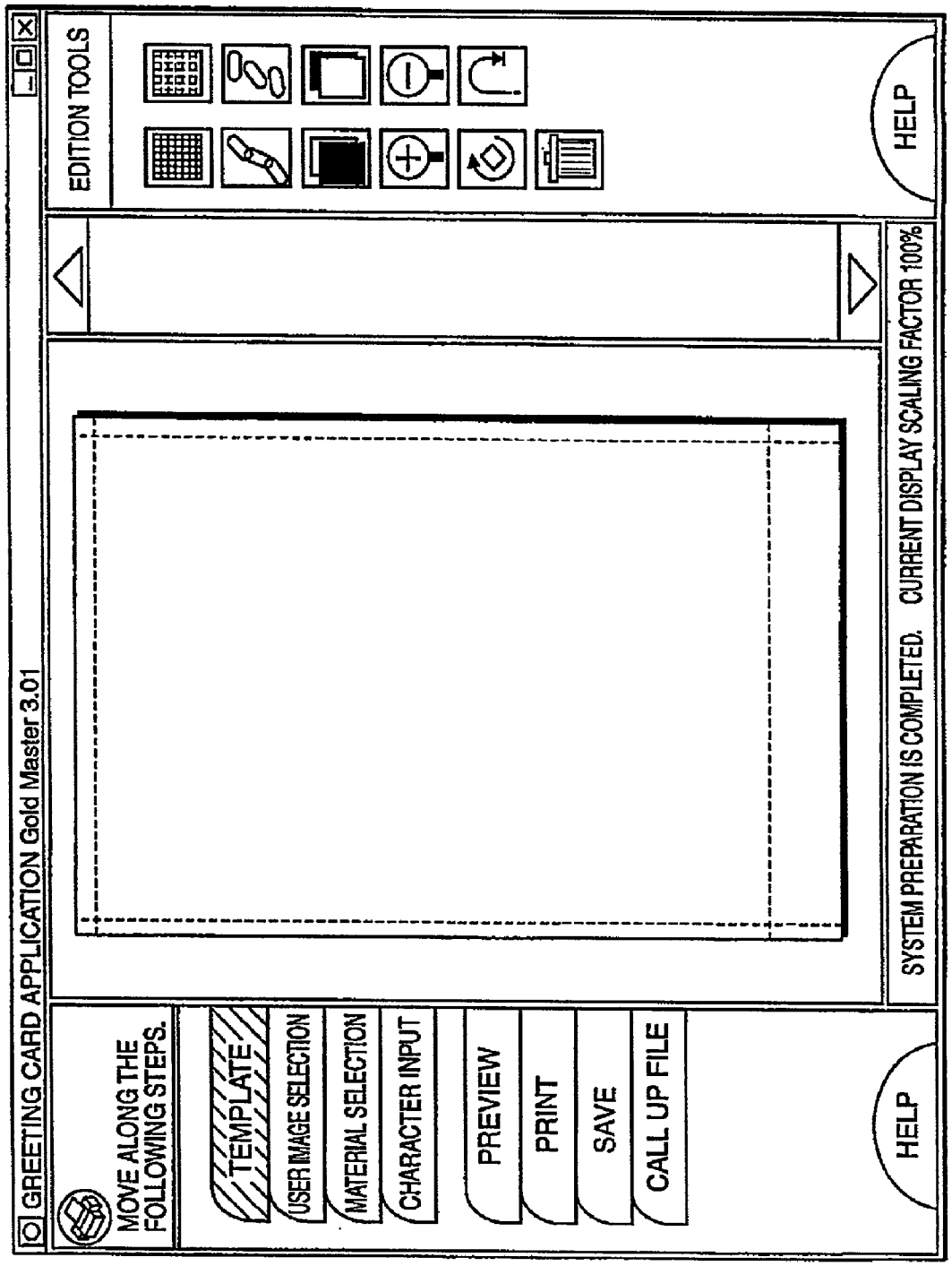
FIG. 19 is an example of screen page displayed on the display device of client system.

FIG. 19 is an example of a screen page to be displayed after depressing the "decision button." This screen page is used as a main screen page for the layout operation. At the right on the screen page, icons for performing various kinds of edition tools are displayed.

The operator selects the respective items illustrated at the left on the screen page, making it possible to perform various kinds of processing in connection with the layout operation. The operation items (operation tags) include "template", "user screen page selection", "material selection", "character input", "preview", "print", "save", and "call up file." Note that FIG. 19 also illustrates the example of screen page when the operation item "template" is selected.

Figure 20:
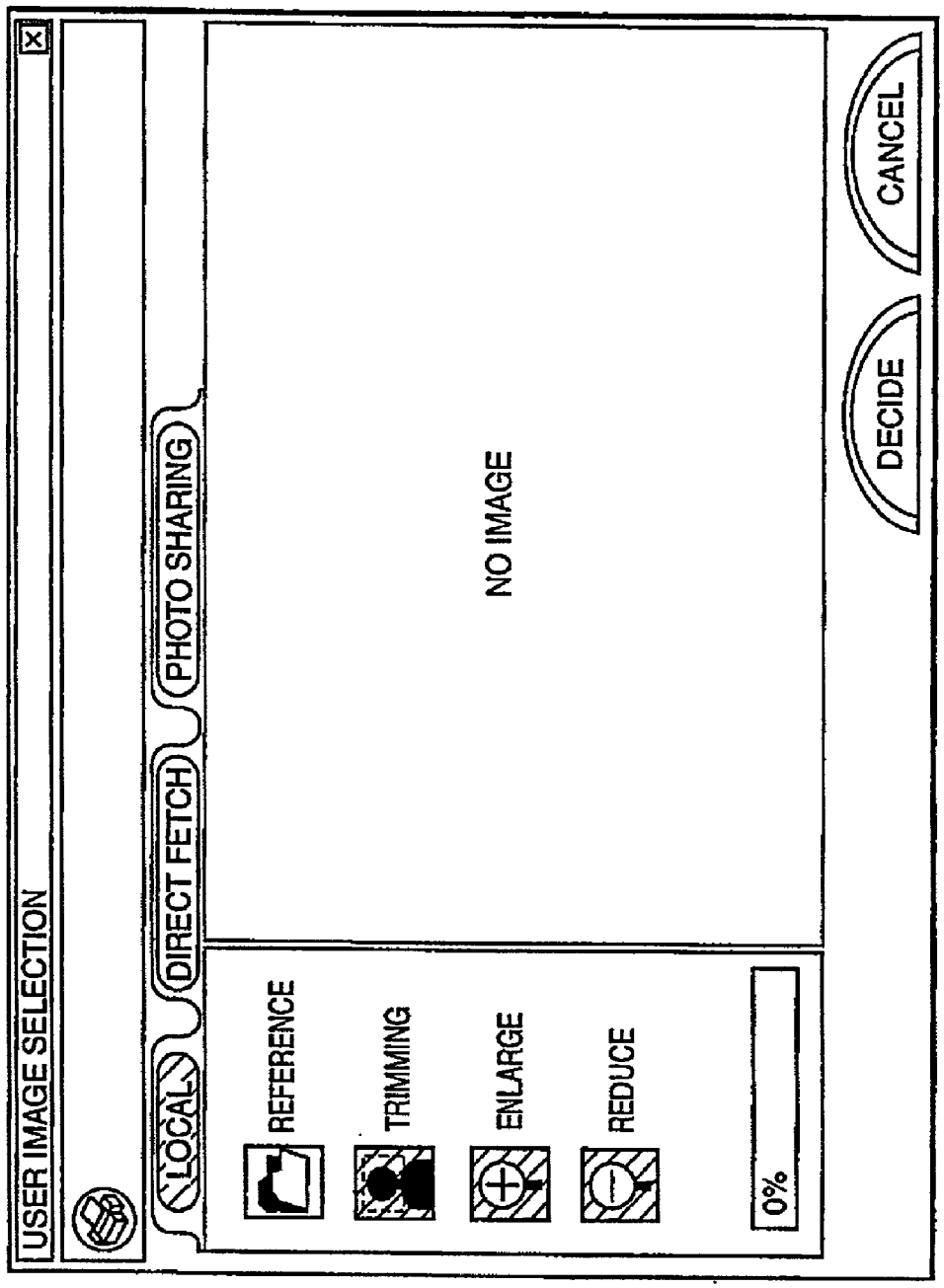
FIG. 20 is an example of screen page displayed on the display device of client system.

In the case where the item "user selection" is selected, the image, which is not stored in the server 2, can be displayed on the layout operation screen page. FIG. 20 illustrates items (tags) for selecting a route for displaying new image information.

Namely, "local" is a selection item for fetching new image information from the image file 307 of client system 3, "direct fetch" is a selection item for new image information using the image input device 309, and "photo sharing" is a selection item for fetching image information provided from the photo sharing system 4 as new image information. Note that simple operation tools such as "trimming" that is shown at the left on the screen page may be used at the fetching time.

Figure 21:
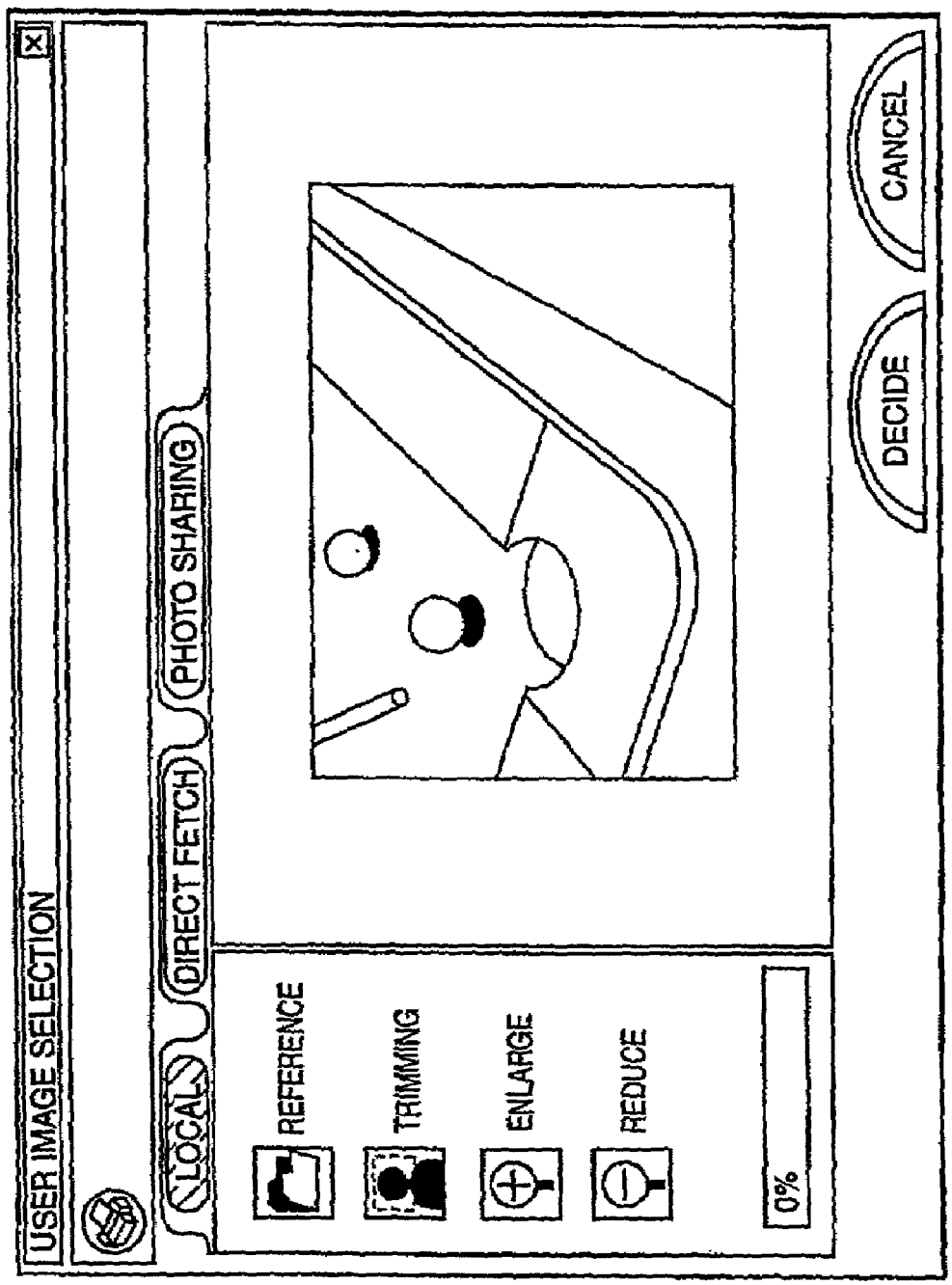
FIG. 21 is an example of screen page displayed on the display device of client system.
Figure 22:
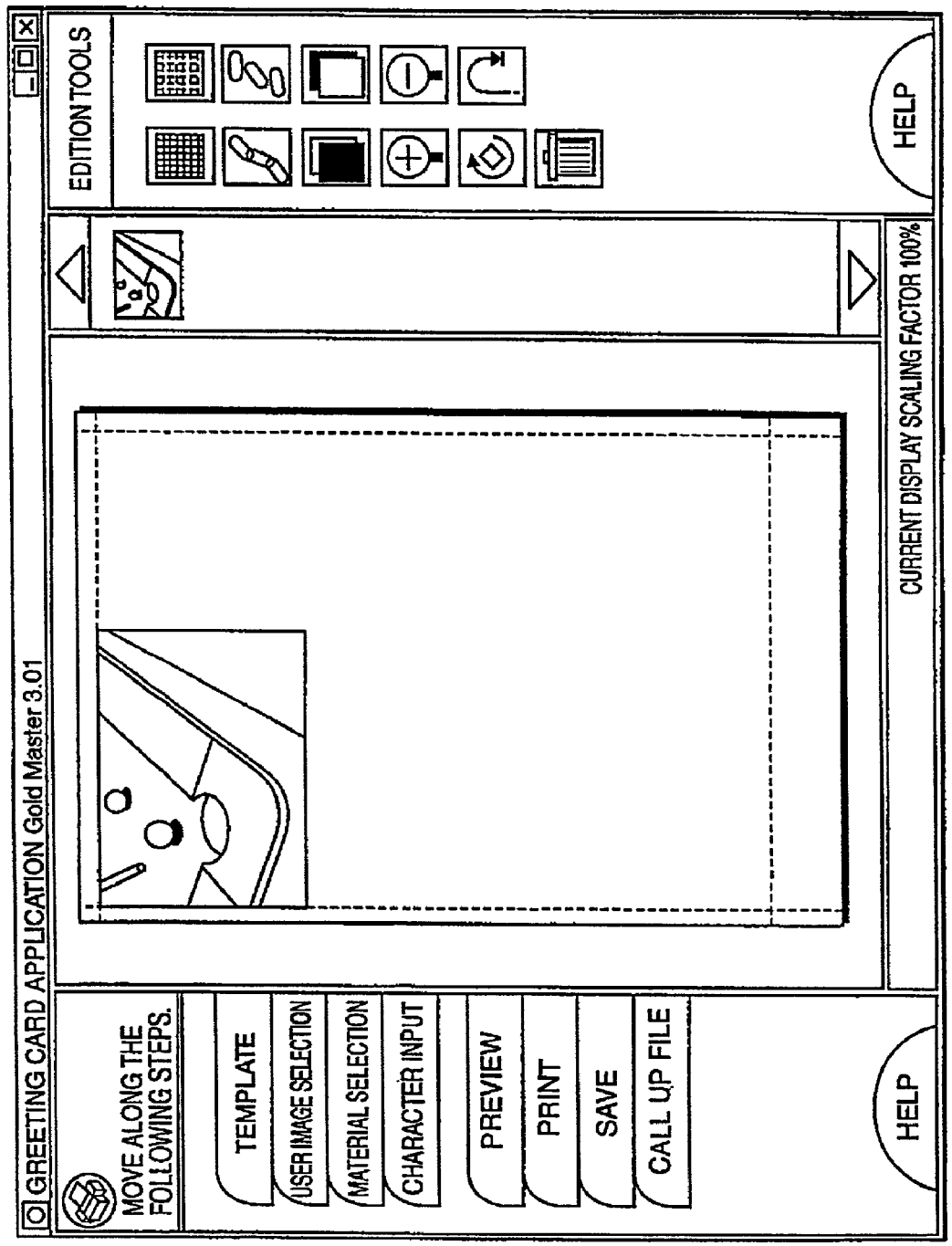
FIG. 22 is an example of screen page displayed on the display device of client system.

FIG. 21 displays an example of an image stored in the image file 307 selected by "local." The operator depresses the "decision" button at the lower right portion if the displayed image is desirable. If the operator wishes another screen page, the operator may depress "cancel." The example of screen page obtained when the "decision" button is depressed is illustrated in FIG. 22.

Figure 23:
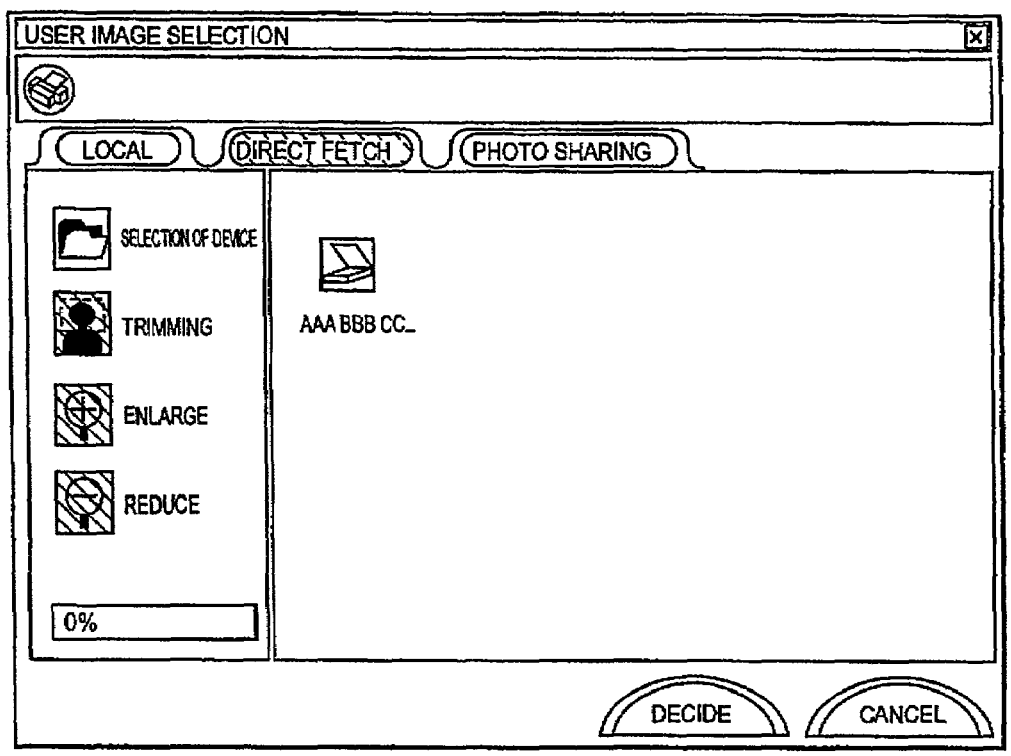
FIG. 23 is an example of screen page displayed on the display device of client system.
Figure 24:
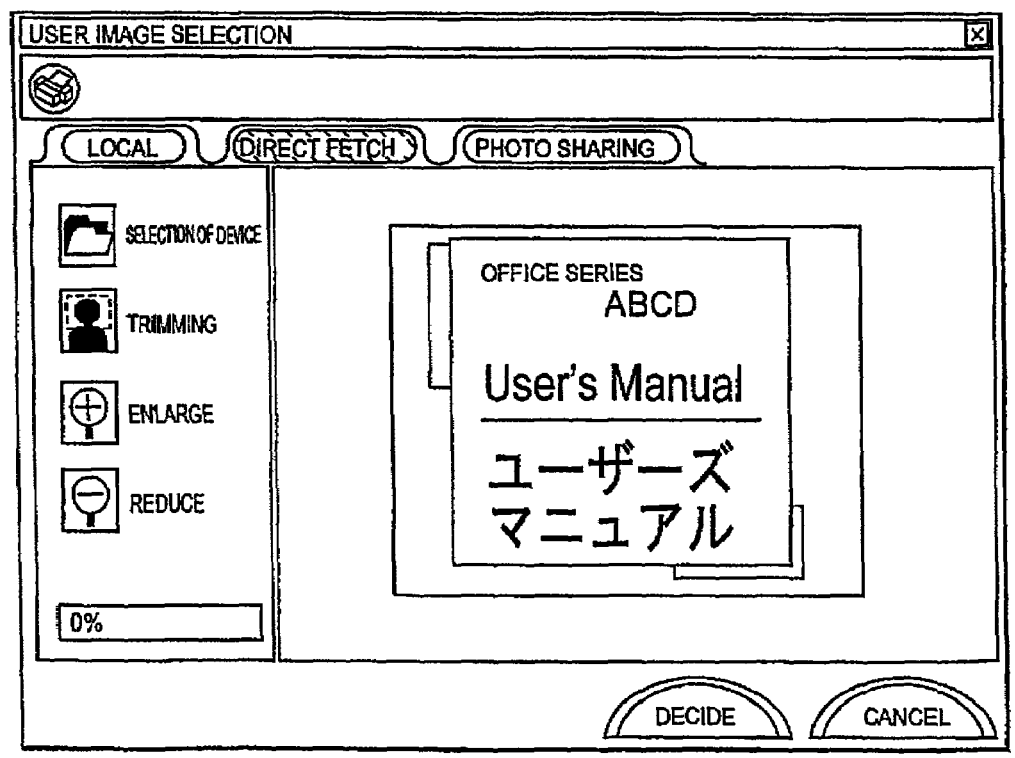
FIG. 24 is an example of screen page displayed on the display device of client system.

FIG. 23 is an example of screen page obtained when "direct fetch" is selected. This screen page displays that a scanner is connected as image input device 309 of client system 3 and the image can be fetched using this scanner. FIG. 24 is an example of screen page after fetching the image using this scanner.

Figure 25:
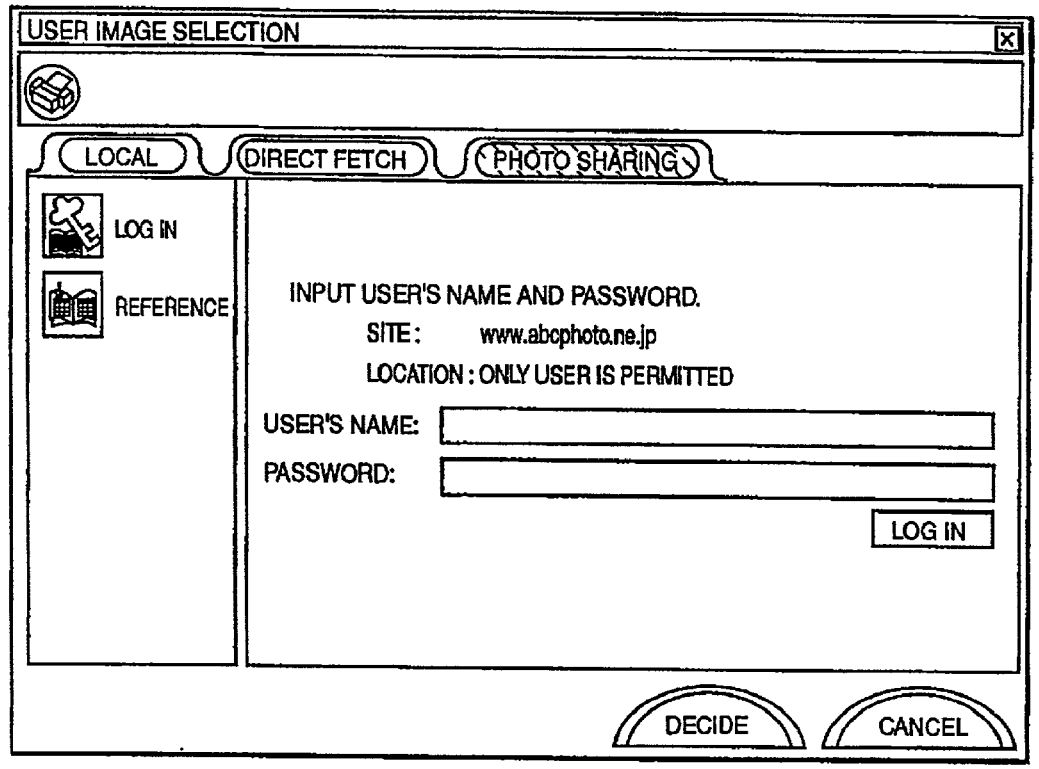
FIG. 25 is an example of screen page displayed on the display device of client system.
Figure 26:
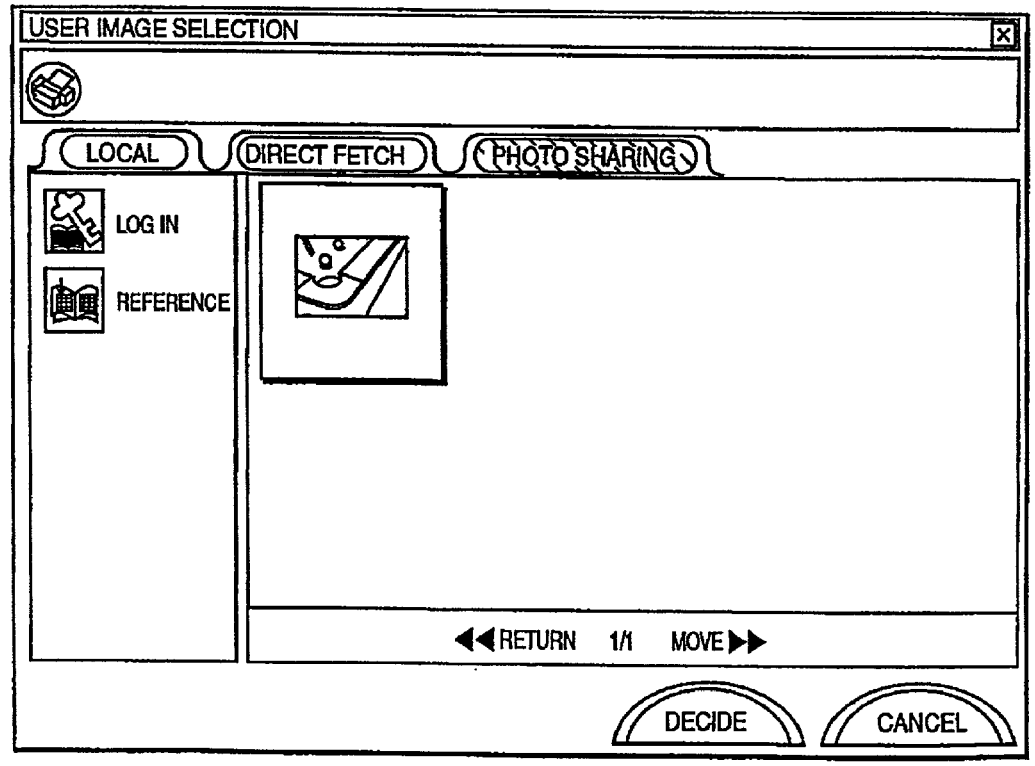
FIG. 26 is an example of screen page displayed on the display device of client system.

FIG. 25 is an example of screen page obtained when "photo sharing" is selected. Here, access to the photo sharing system 4 from the client system 3 is made via the network 5. Particularly, in FIG. 25, the operator tries to fetch the image stored in the private image information storage 404 of photo sharing system 4 so as to urge the operator to input the user name and password. FIG. 26 shows the state in which image information held in the private image information storage 404 is displayed using the thumbnail.

Figure 27:
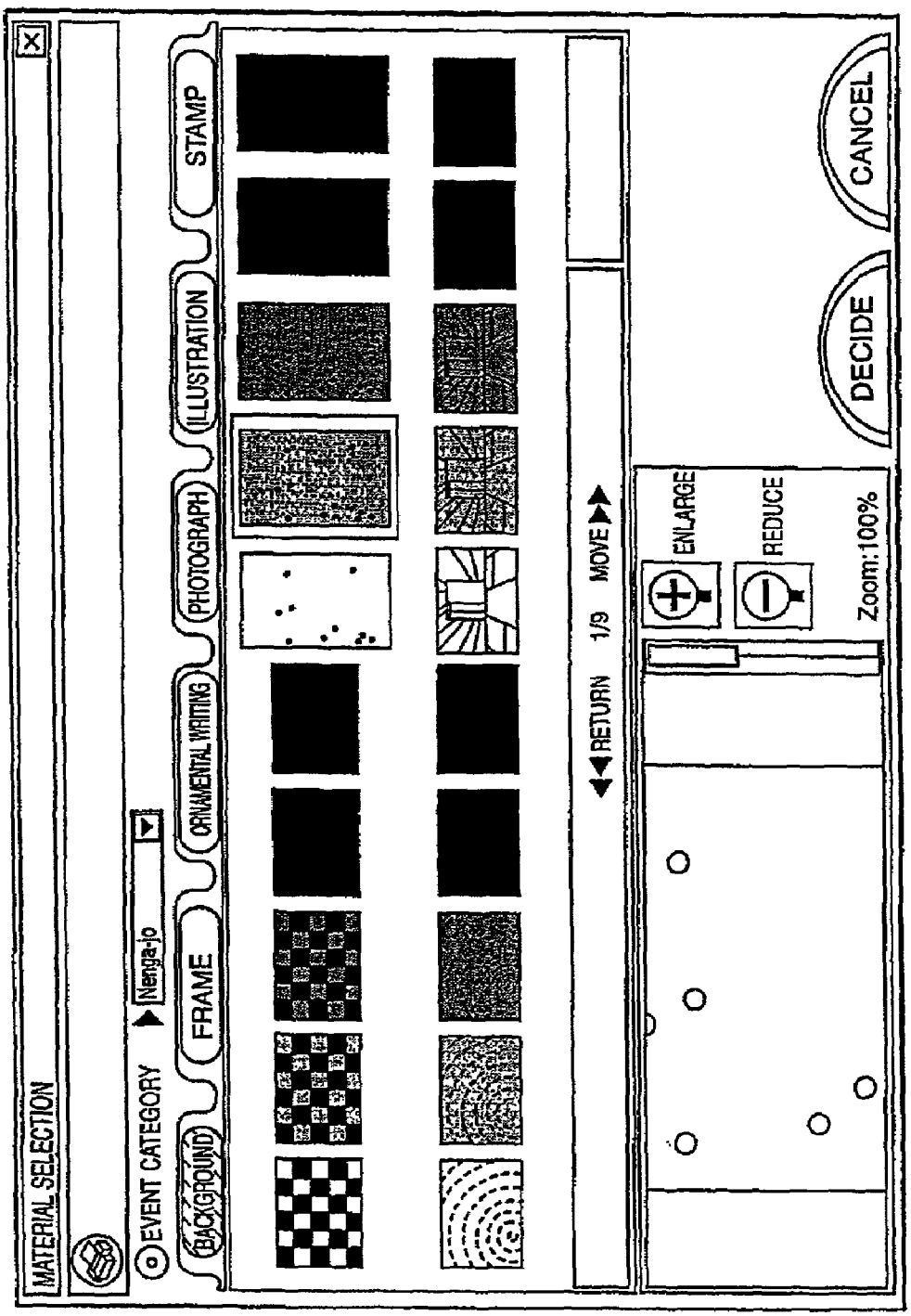
FIG. 27 is an example of screen page displayed on the display device of client system.

FIG. 27 illustrates an example of screen page obtained when "material selection" is selected from among the items illustrated in FIG. 19. Here, it is possible to select various kinds of image information stored in the template information storage 205 and display image information storage 206 of the server 2. As illustrated in the same figure, image information obtainable from the server 2 includes background, frame, ornamental writing, photograph, illustration, and stamp.

Figure 28:
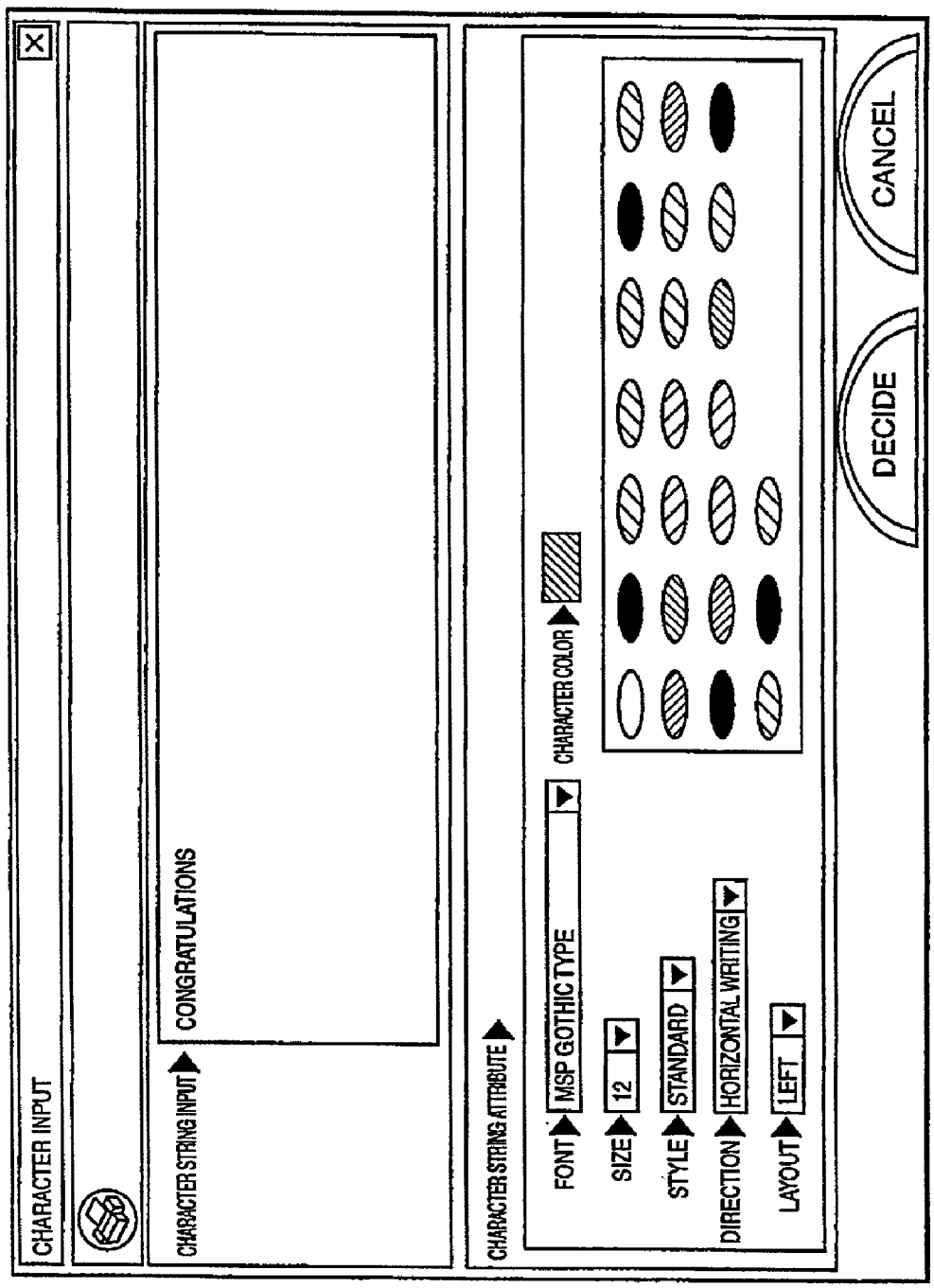
FIG. 28 is an example of screen page displayed on the display device of client system.
Figure 29:
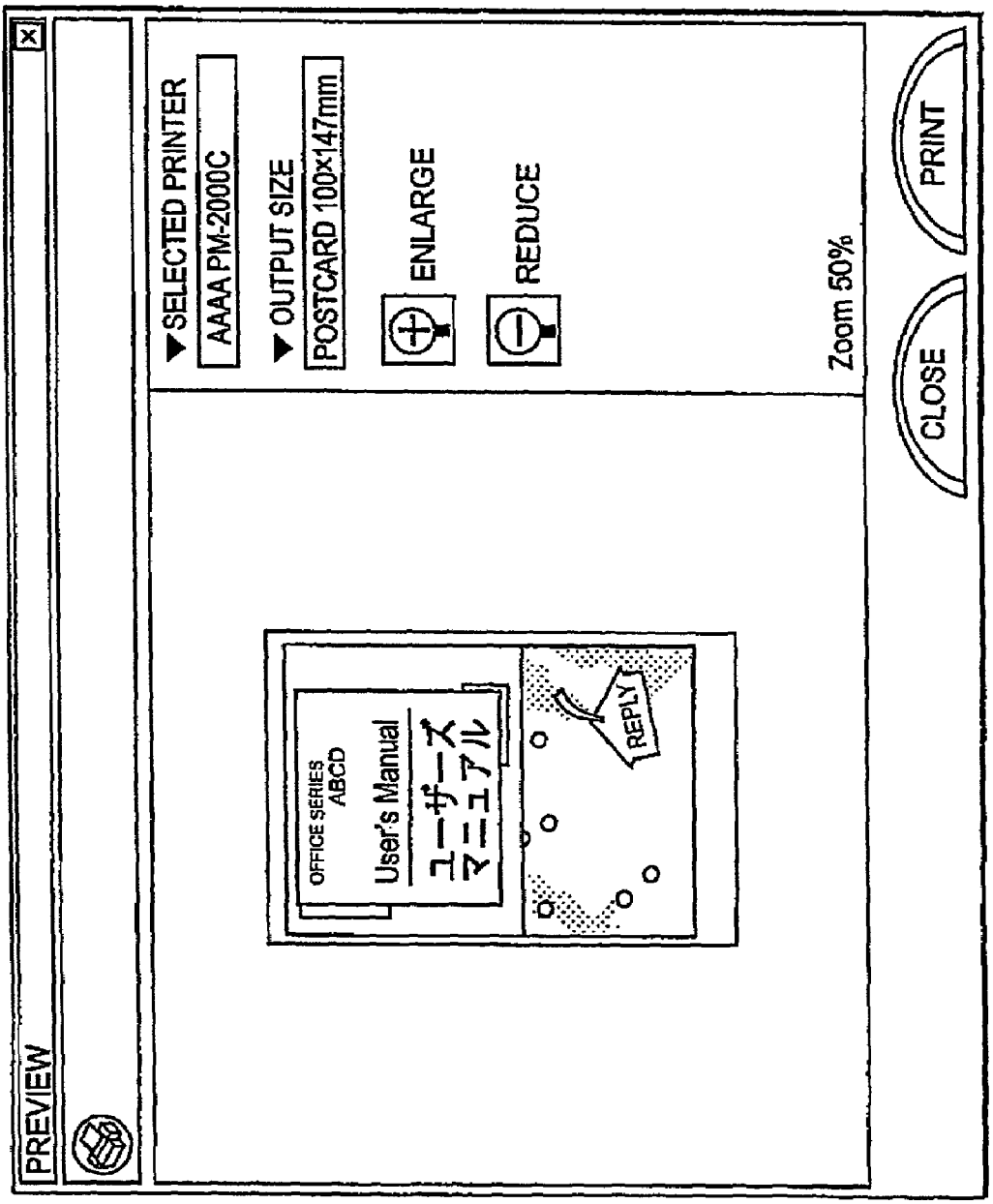
FIG. 29 is an example of screen page displayed on the display device of client system.

FIG. 28 shows an example of screen page obtained when "character input" is selected from among the items illustrated in FIG. 19. Here, it is possible to set the character font and size to be input. FIG. 29 shows an example of screen page obtained when "preview" is selected from among the items illustrated in FIG. 19. This is used to confirm whether or not the setting status and advance status at the actual printing and to accept the setting such as the number of printed paper on the screen page.

Figure 30:
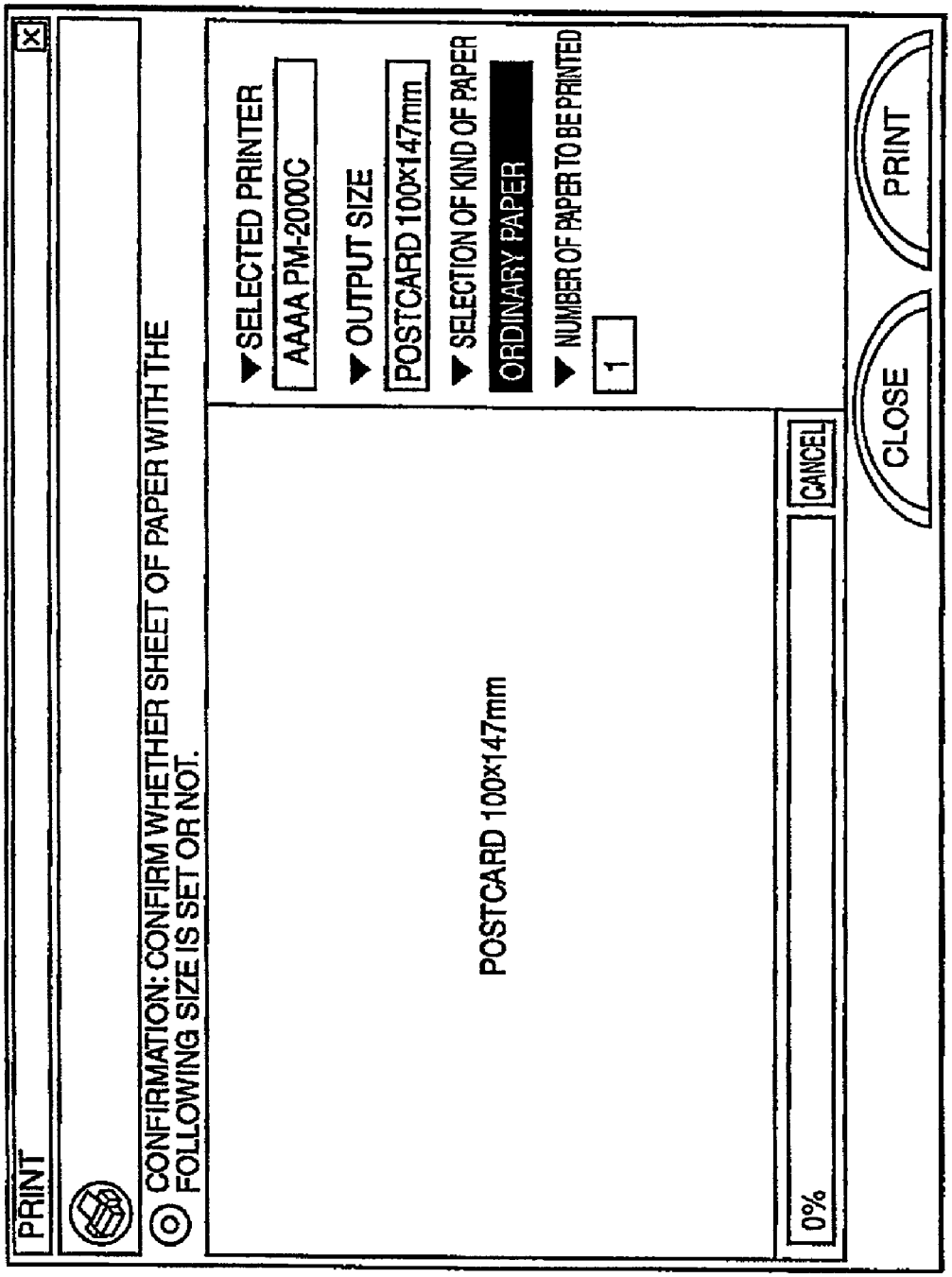
FIG. 30 is an example of screen page displayed on the display device of client system.

FIG. 30 shows an example of screen page obtained when "print" is selected from among the items illustrated in FIG. 19. In connection with the other items "save" and "call of file" illustrated in FIG. 19, they are items to save image information already generated by the layout operation and read it, and the example of a detailed screen page is omitted.

Thus, this embodiment makes it possible to appropriately provide the edit image via the network according to the client's desire. Particularly, in this embodiment, predetermined Java applet and user edition AP are distributed to the client system 3 in response to the access request sent from the client system 3. Then, intercommunication between the client system 3 that executes the distributed user edition AP and server 2 is carried out to support processing that includes the layout operation to printing. This reduces the load taken on the server 2 and client system 3. Moreover, this embodiment uses the technique in which compressed image information is superimposed on one another without being completely decompressed when the server 2 performs edit processing. The use of this technique reduces the load taken on the server 2 largely. Accordingly, this makes it possible to distribute the edit image rapidly via the network.

Still moreover, in the case where the edit image is distributed using the satellite connection as network 5, the performance relating to transmission can be improved and the so-called broadcasting in which the same edit image can be provided to the plurality of client system 3 simultaneously is possible. Accordingly, in the case where the client has many branches, it is possible to distribute the edit image requested from the head office to the respective branches simultaneously.

Particularly, in this embodiment, in the case where the user, who operates the client system 3, wishes to perform the layout operation (user edition) using new image information, which is not stored in the serve 2, the following environment is constructed as a route for fetching the new image information.

Namely, an environment that can read an image from the image file 307, fetch an image using the image input device 309, or fetch image information stored in the photo sharing system 4 via the network 5 is constructed in the client system 3.

This makes it possible for the operator of client system 3 to increase the degree of freedom of image information using the layout operation and to perform the layout operation using favorable image information.

As is obvious from the above explanation, according to this embodiment, an environment that can perform the layout generation easily is constructed in the client system and the edit image where the materials are positioned or superimposed on one another is distributed via the network according to the generated layout and other operation result. More specifically, it is possible to easily construct the system that urges the client side to generate the layout using image information with small amounts, edits image information to be originally used according to the operation of image information, and distributes the edit image speedily and efficiently.

Moreover, the technique in which compressed image information is superimposed on one another without being completely decompressed is used at the time of performing edit processing. The use of this technique reduces the load taken on the apparatus that performs edition so as to distribute the edit image rapidly.

As explained above, this invention can provide such a special effect that can easily construct the environment that edits image information rapidly and efficiently by use of desired image information.

Various embodiments and changes may be made thereunto without departing from the broad spirit and scope of the invention. The above-described embodiment intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

What is claimed is:

1. An image editing support system provided on a network, said network being connectable to a computer system prestoring image information and a user apparatus connected to a printer, comprising:

program managing means for sending an application program for editing image information to the user apparatus accessed through said network, and for constructing an image operation environment on the user apparatus by executing the application program on the user apparatus;

image distributing means for distributing image information in response to a request from the user apparatus being constructed in the image operation environment thereon;

information obtaining means for obtaining the content of operation performed with respect to at least one image information comprising image information distributed from the image distributing means, image information stored in the user apparatus, and image information obtained from the computer system by the user apparatus, and for obtaining the image information being operated; and editing support means for editing said obtained image information according to the obtained content of operation, converting the edited image information into print data corresponding to the printer of the user apparatus and transmitting the converted print data to the user apparatus for printing by the printer.

2. The image editing support system according to claim 1, wherein said image information distributed from said image distributing means to said user apparatus comprises second image information having lower resolution than first image information, said first image representing a desired material with desired resolution for printing, wherein said application program causing to construct the image operation environment for editing the second image information on the user apparatus, and wherein said editing support means editing the first image information according to the content of operation performed with respect to the second image.

3. The image editing support system according to claim 1, further comprising a search means for receiving search request from user apparatus with respect to material of image information to be operated and/or predetermined template for editing, and sending the search result to the user apparatus.

4. The image editing support system according to claim 1, further comprising a registration means for receiving registration request from user apparatus with respect to material of image information to be operated and/or predetermined template for editing, and registering the received material and template in the form being searchable according to a condition of search including an identification information thereof or a keyword.

5. The image editing support system according to claim 2, wherein said second image information being compressed image information, and wherein said application program causes to construct a function for operating the second image information in the intermediate stage in which the compressed image information of the second image information is decompressed.

6. The image editing support system according to claim 2, wherein said application program causes to construct an operation environment for adding additional information including characteristic information to the image information to be edited.

7. The image editing support system according to claim 2, wherein said application program causes to construct an operation environment for combining the image information to be edited and the image information prestored in the computer system.

8. The image editing support system according to claim 2, wherein said application program causes to output definition information as the content of operation performed with respect to the image information to be edited, and wherein said editing support means edits the image information obtained by said information obtaining means in accordance with said definition information.

9. An image editing support method, which is executed on an image editing system provided on a network, said network being connectable to a computer system prestoring image information and a user apparatus connected to a printer, the method comprising the steps of:

sending an application program for editing image information to the user apparatus accessed through said network, and constructing an image operation environment on the user apparatus by executing the application program on the user apparatus;

distributing image information in response to a request from the user apparatus being constructed in the image operation environment thereon;

obtaining the content of operation performed with respect to at least one image information comprising said distributed image information, image information stored in the user apparatus, and image information obtained from the computer system by the user apparatus, and further obtaining the image information being operated; and editing the obtained image information according to the obtained content of operation, converting the edited image information into print data corresponding to the printer of the user apparatus and transmitting the converted print data to the user apparatus for printing by the printer.

10. A computer-readable medium storing a computer program, the computer-readable medium being applicable to a computer provided on a network, said network being connectable to a computer system prestoring an image and a user apparatus connected to a printer, said computer program causes to operate said computer as an image editing support system for said user apparatus, said computer program executing the steps of:

sending an application program for editing image information to the user apparatus accessed through said network, and constructing an image operation environment on the user apparatus by executing the application program on the user apparatus;

distributing image information in response to a request from the user apparatus being constructed in the image operation environment thereon;

obtaining the content of operation performed with respect to at least one image information comprising said distributed image information, image information stored in the user apparatus, and image information obtained from the computer system by the user apparatus, and further obtaining the image information being operated; and editing the obtained image information according to the obtained content of operation, converting the edited image information into print data corresponding to the printer of the user apparatus and transmitting the converted print data to the user apparatus for printing by the printer.

11. The system according to claim 1, wherein said network is connected to the computer system prestoring image information and the user apparatus, wherein the user apparatus is connected to the printer, and wherein the user manipulates the user apparatus and the printer.

12. The system according to claim 1, wherein the computer system is in a server of an image service provider and wherein the computer system comprises the program managing means and the editing support means.

13. The system according to claim 1, wherein:
the computer system that prestores image information is connected via the network to the user apparatus that is connected to the printer,
the computer system comprising the program managing means and the editing support means,
the user apparatus instructs the printer to print the converted print data,
the program managing means distributes a java applet to authenticate a user at the user apparatus, and
when the user is authenticated, the program managing means distributes the application program for editing image information.

* * * * *